United States Patent
Xiu et al.

(10) Patent No.: US 11,991,351 B2
(45) Date of Patent: May 21, 2024

(54) TEMPLATE-BASED INTER PREDICTION TECHNIQUES BASED ON ENCODING AND DECODING LATENCY REDUCTION

(71) Applicant: VID SCALE, INC., Wilmington, DE (US)

(72) Inventors: Xiaoyu Xiu, San Diego, CA (US); Yuwen He, San Diego, CA (US); Yan Ye, San Diego, CA (US)

(73) Assignee: VID SCALE INC., Wilmington, DE (US)

( * ) Notice: Subject to any disclaimer, the term of this patent is extended or adjusted under 35 U.S.C. 154(b) by 0 days.

(21) Appl. No.: 17/694,168

(22) Filed: Mar. 14, 2022

(65) Prior Publication Data
US 2022/0201290 A1     Jun. 23, 2022

Related U.S. Application Data

(63) Continuation of application No. 16/969,190, filed as application No. PCT/US2019/023557 on Mar. 22, 2019, now Pat. No. 11,317,085.
(Continued)

(51) Int. Cl.
*H04N 19/105*     (2014.01)
*H04N 19/132*     (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC .......................... H04N 19/105; H04N 19/132
See application file for complete search history.

(56) References Cited

U.S. PATENT DOCUMENTS 10,055,189 B2 *   8/2018   Tsai ..................... H04N 19/186
10,511,852 B1 *   12/2019   Xu ......................... H04N 19/96
(Continued)

FOREIGN PATENT DOCUMENTS

| CN | 101557514 A | 10/2009 |
|---|---|---|
| JP | 2010268259 A | 11/2010 |

(Continued)

OTHER PUBLICATIONS

Alshina et al, "Known Tools Performance Investigation for Next Generation Video Coding", Document VCEG-AZ05, ITU-Telecommunication Standardization Sector, Study Group 16 Question 6, Video Coding Experts Group (VCEG), 52nd Meeting, pp. 1-7, Warsaw, Poland, Jun. 19-26, 2015.
(Continued)

*Primary Examiner* — Irfan Habib
(74) *Attorney, Agent, or Firm* — Xiaoan Lu

(57) ABSTRACT

Video coding methods are described for reducing latency in template-based inter coding. In some embodiments, a method is provided for coding a video that includes a current picture and at least one reference picture. For at least a current block in the current picture, a respective predicted value is generated (e.g. using motion compensated prediction) for each sample in a template region adjacent to the current block. Once the predicted values are generated for each sample in the template region, a process is invoked to determine a template-based inter prediction parameter by using predicted values in the template region and sample values the reference picture. This process can be invoked without waiting for reconstructed sample values in the template region. Template-based inter prediction of the current block is then performed using the determined template-based inter prediction parameter.

18 Claims, 18 Drawing Sheets

Related U.S. Application Data

(60) Provisional application No. 62/656,247, filed on Apr. 11, 2018, provisional application No. 62/650,956, filed on Mar. 30, 2018.

(51) Int. Cl.
  *H04N 19/159* (2014.01)
  *H04N 19/176* (2014.01)
  *H04N 19/184* (2014.01)
  *H04N 19/46* (2014.01)
  *H04N 19/583* (2014.01)
  *H04N 19/625* (2014.01)
  *H04N 19/64* (2014.01)

(52) U.S. Cl.
  CPC ......... *H04N 19/176* (2014.11); *H04N 19/184* (2014.11); *H04N 19/46* (2014.11); *H04N 19/583* (2014.11); *H04N 19/625* (2014.11); *H04N 19/64* (2014.11)

(56) References Cited

U.S. PATENT DOCUMENTS

| | | | | |
|---|---|---|---|---|
| 10,750,172 | B2* | 8/2020 | Vanam | H04N 19/117 |
| 10,750,203 | B2* | 8/2020 | Chen | H04N 19/577 |
| 10,798,404 | B2* | 10/2020 | Chuang | H04N 19/105 |
| 10,880,552 | B2* | 12/2020 | Lee | H04N 19/176 |
| 10,931,969 | B2* | 2/2021 | Chen | H04N 19/119 |
| 10,965,955 | B2* | 3/2021 | Chen | H04N 19/159 |
| 11,153,602 | B2* | 10/2021 | Zhang | H04N 19/573 |
| 11,368,676 | B2* | 6/2022 | Xiu | H04N 19/105 |
| 2010/0272183 | A1* | 10/2010 | Kamp | H04N 19/573 375/E7.243 |
| 2011/0188579 | A1* | 8/2011 | Lin | H04N 19/56 375/E7.125 |
| 2014/0105298 | A1 | 4/2014 | Kamp et al. | |
| 2014/0153636 | A1* | 6/2014 | Esenlik | H04N 19/176 375/240.02 |
| 2017/0134726 | A1* | 5/2017 | Sim | H04N 19/105 |
| 2017/0180319 | A1* | 6/2017 | Nimmagadda | H04L 41/0893 |
| 2017/0180423 | A1* | 6/2017 | Nimmagadda | H04L 63/0263 |
| 2018/0063531 | A1 | 3/2018 | Hu et al. | |
| 2018/0077417 | A1 | 3/2018 | Huang | |
| 2018/0241998 | A1* | 8/2018 | Chen | H04N 19/109 |
| 2019/0230350 | A1* | 7/2019 | Chen | H04N 19/139 |
| 2019/0356914 | A1* | 11/2019 | Tao | H04N 19/182 |
| 2020/0154124 | A1* | 5/2020 | Lee | H04N 19/105 |
| 2021/0297677 | A1* | 9/2021 | Jang | H04N 19/70 |

FOREIGN PATENT DOCUMENTS

| | | |
|---|---|---|
| JP | 2011511541 A | 4/2011 |
| JP | 2013513333 A | 4/2013 |
| JP | 2017536725 A | 12/2017 |
| RU | 2487489 C2 | 7/2013 |
| WO | WO2010095560 A1 | 8/2010 |
| WO | WO2016019207 A1 | 2/2016 |
| WO | WO2016192073 A1 | 12/2016 |
| WO | WO2017084512 A1 | 5/2017 |
| WO | WO2019010123 A1 | 1/2019 |

OTHER PUBLICATIONS

Karczewicz et al., "Report of AHG1 on Coding Efficiency Improvements", Document: VCEG-AZ01, ITU-Telecommunication Standardization Sector, Study Group 16 Question 6, Video Coding Experts Group (VCEG), 52nd Meeting, pp. 1-2, Warsaw, Poland, Jun. 19-26, 2015.

Kamp et al., "Video coding technology proposal by RWTH Aachen University, Institut für Nachrichtentechnik RWTH Aachen University", pp. 1-11, JCTVC-A112, Apr. 15-23, 2010.

Hsu et al., "Description of SDR video coding technology proposal by MediaTek", Document: JVET-J0018, Jvet- J0018, Joint Video Experts Team (JVET) of ITU-T SG 16 WP 3 and ISO/IEC JTC 1/SC 29/WG 11, 10th Meeting, pp. 1-64, San Diego, US, Apr. 10-20, 2018.

Chen et al., "Description of Sdr Hdr and 360° video coding technology proposal by Qualcomm and Technicolor-low and high complexity versions", Document: JVET-J0021, Joint Video Exploration Team (JVET) of ITU-T SG 16 WP 3 and ISO/IEC JTC 1/SC 29/WG 11, 10th Meeting, pp. 1-43, San Diego, US, Apr. 10-20, 2018.

Akula et al., "Description of SDR, HDR and 360° video coding technology proposal considering mobile application scenario by Samsung, Huawei, GoPro, and HiSilicon", Document: JVET-J0024_v2, buJoint Video Exploration Team (JVET) of ITU-T SG 16 WP 3 and ISO/IEC JTC 1/SC 29/WG 11, 10th Meeting, pp. 1-119, San Diego, US, Apr. 10-20, 2018.

Bross et al., "High Efficiency Video Coding (HEVC) text specification draft 10 (for FDIS & Last Call)", Document: JCTVC-L1003, Joint Collaborative Team on Video Coding (JCT-VC) of ITU-T SG 16 WP 3 and ISO/IEC JTC 1/SC 29/WG 11, 12th Meeting, pp. 1-298, Geneva, CH, Jan. 14-23, 2013.

Chen et al., "Algorithm Description of Joint Exploration Test Model 7 (JEM 7)", Joint Video Exploration Team (JVET) of ITU-T SG 16 WP 3 and ISO/IEC JTC1/SC29/WG11/N17055, 7th Meeting: Torino, IT, Document: JVET-G1001-v1, pp. 1-48, Jul. 13-21, 2017.

Anonymous, "Advanced video coding for generic audiovisual services", Series H: Audiovisual and Multimedia Systems , Infrastructure of audiovisual services—Coding of moving video, ITU-T Rec H.264 and ISO/IEC/MPEG 4 part 10, Feb. 2014.

Ohm et al., "Report of AHG on Future Video Coding Standardization Challenges", International Organisation for Standardisation Organisation Internationale de Normalisation ISO/IEC JTC1/SC29/WG11 Coding of Moving Pictures and Audio, ISO/IEC JTC1/SC29/WG11 MPEG2014/M36782, pp. 1-4, Warsaw, Poland Jun. 2015.

Chen, "Coding tools investigation for next generation video coding", COM 16-C 806-E, Study Period 2013-2016, pp. 1-7, Jan. 2015.

Kamp et al., "Decoder Side Motion Vector Derivation", ITU—Telecommunications Standardization Sector, Video poding Experts Group (VCEG), Document VCEG-AG16, pp. 1-24, 33rd Meeting: Shenzhen, China, Oct. 20, 2007.

Anonymous, "VC-1 Compressed Video Bitstream Format and Decoding Process", SMPTE Standard, Amendment 2:2011 to SMPTE ST 421M:2006, Apr. 2006.

Chen et al., "Description of SDR, HDR and 360° video coding technology proposal by Huawei, GoPro, HiSilicon, and Samsung", JVET-J0025, Joint Video Exploration Team (JVET) of ITU-T SG 16 WP 3 and ISO/IEC JTC 1/SC 29/WG 11, 10th Meeting, pp. 1-128, San Diego, US, Apr. 10-20, 2018.

Xiu et al., "On latency reduction for template-based inter prediction", Document: JVET-J0045, Joint Video Experts Team (JVET) of ITU-T SG 16 WP 3 and ISO/IEC JTC 1/SC 29/WG 11, 10th Meeting: San Diego, US, pp. 1-7, Apr. 10-20, 2018.

Kamp, et al., "Decoder-Side Motion Vector Derivation for Block-Based Video Coding", IEEE Transactions on Circuits and Systems for Video Technology, vol. 22, No. 12, Dec. 2012, 14 pages.

* cited by examiner

TEMPLATE-BASED INTER PREDICTION TECHNIQUES BASED ON ENCODING AND DECODING LATENCY REDUCTION

CROSS-REFERENCE TO RELATED APPLICATIONS

This application is a Continuation of U.S. application Ser. No. 16/969,190, filed Aug. 12, 2020, which is a National Phase entry under 35 U.S.C. § 371 of International Application No. PCT/US2019/023557, filed Mar. 22, 2019, which claims the benefit of U.S. Provisional Patent Application Ser. No. 62/656,247, filed Apr. 11, 2018 and U.S. Provisional Patent Application Ser. No. 62/650,956, filed Mar. 30, 2018, each of which is incorporated by reference herein in its entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6NCEG and ISO/IEC/MPEG.

The first version of the HEVC standard was finalized in January, 2013, and offers approximately 50% bit-rate saving at equivalent perceptual quality compared to the prior generation video coding standard H.264/MPEG AVC. Although the HEVC standard provides significant coding improvements over its predecessor, there is evidence that higher coding efficiency can be achieved with additional coding tools over HEVC. Based on that, both VCEG and MPEG started the exploration work of new coding technologies for future video coding standardization. In October 2015, ITU-T VCEG and ISO/IEC MPEG formed the Joint Video Exploration Team (JVET) to begin significant study of advanced technologies that could enable substantial enhancement of coding efficiency over HEVC. In the same month, a software codebase, called Joint Exploration Model (JEM) was established for future video coding exploration work. The JEM reference software was based on HEVC Test Model (HM) that was developed by JCT-VC for HEVC. Additional proposed coding tools may be integrated into the JEM software and tested using JVET common test conditions (CTCs).

SUMMARY

Exemplary embodiments include methods that are used in video encoding and decoding (collectively "coding"). In some embodiments, a method is provided for encoding or decoding a video that includes a current picture and at least a first reference picture. For at least a current block in the current picture, a predicted value is generated (e.g. using motion-compensated prediction) for each sample in a template region adjacent to the current block. At least one template-based inter prediction parameter is determined by comparing the predicted values of at least a subset of the samples in the template region with corresponding sample values (which may be reconstructed sample values) in at least one reference template region in at least the first reference picture. Template-based inter prediction of the current block is performed using the determined template-based inter prediction parameter.

In some embodiments, a process for determining the template-based inter prediction parameter is invoked in response to the generation of the predicted values for each sample in the template region. This allows the prediction of the sample values in the current block to proceed in parallel with the reconstruction of the sample values in the template region.

In some embodiments, at least one of the samples in the template region has a coded nonzero residual. In some embodiments, after the template-based inter prediction parameter is determined, the coded nonzero residual value is added to at least one of the predicted values in the template region to generate a respective reconstructed sample value.

In some embodiments, the subset of samples in the template region is selected to include only samples that have zero residual values. The values of coded block flags for respective blocks containing the samples may be used to identify those samples that have zero residual values. In some embodiments, the template region has at least two sub-regions (e.g. a first sub-region of samples above the current block and a second sub-region of samples to the left of the current block), and samples in a sub-region are selected only if all samples in that sub-region have zero residual values.

In some embodiments, overlapped block motion compensation (OBMC) is performed on at least some of the samples in the template region after determination of the template-based inter prediction parameter.

In some embodiments, the samples used to determine the template-based inter prediction parameter are weighted based on estimated (or actual) residual magnitudes of the respective samples in the template region, with greater weights being used for lower estimated (or actual) residual magnitudes. Estimated (or actual) residual magnitudes may be based on information obtained without performing de-quantization or inverse transformation. In some embodiments, the residual magnitude of a sample is determined based on the value of a coded block flag of a block containing the respective sample. In some embodiments, the residual magnitude of a sample is estimated based on a total energy of transform coefficients for a block containing the respective sample. In some embodiments, a first predetermined lower weight is used for samples with non-zero estimated residual magnitudes and a second predetermined higher weight is used for samples with residual magnitudes that are estimated (or known) to be zero.

In some embodiments, instead of using only predicted values in the template region to determine the template-based inter prediction parameter, at least some of the sample values in the template region are partially reconstructed for use in determining the parameter. For example, sample values may be partially reconstructed by adding a DC prediction residual component to the predicted values. The DC component may be obtained without performing inverse transformation. In some embodiments, this partial reconstruction is performed only for sample values in blocks coded using either DCT-II or DCT-V. In some embodiments, the partial reconstruction of the sample values is performed only for those sample values in blocks that are not coded using a NSST.

In some embodiments, the template-based inter prediction of the current block is performed using local illumination compensation (LIC). In such embodiments, the template-based inter prediction parameters include at least one scaling factor α and at least one offset β.

In some embodiments, the template-based inter prediction of the current block is performed using template-based frame-rate up-conversion (FRUC). In some embodiments, the template-based inter prediction parameters include a motion vector for prediction of the current block. In some embodiments, both LIC and FRUC are used to predict the current block.

Additional methods described herein make use of an adaptive template size. One such method is provided for encoding or decoding a video that includes a current picture and at least a first reference picture. For at least a current block in the current picture, a template size is selected based on the size of the current block, and a prediction for the current block is generated using template-based inter prediction. For example, samples in a template region that is adjacent to the current block and that has the selected template size may be compared with corresponding sample values in at least the first reference template to determine at least one template-based inter prediction parameter, and the determined parameter(s) may be used in performing template-based inter prediction of the current block.

Further methods described herein make use of template slices, where encoding or decoding of a current block in one template slice is constrained not to use samples in a different template slice for template-based inter coding of the current block. Prediction modes other than template-based inter-coding may still make use of samples (or other coding information such as motion vectors) in a different template slice. In one such method, a plurality of template slices are defined in the current picture, with each template slice including a plurality of blocks. A prediction mode is determined for coding of each block in a current template slice. The prediction mode is selected from among at least one template-based inter-prediction mode and at least one non-template-based prediction mode. A prediction is generated for each block in the current template slice, where the prediction of any block in the current template slice using a template-based prediction mode is constrained from using for the prediction any samples that are in the current picture but are outside the current template slice. Information on the boundaries of the template slices may be signaled in a bitstream. For example, information on the number of coding tree units (CTUs) in each template slice or the number of rows of CTUs in each template slice may be signaled in a bitstream. The use of template slices as described herein allows different template slices to be encoded or decoded in parallel.

Further embodiments include encoder and decoder (collectively "codec") systems configured to perform the methods described herein. Such systems may include a processor and a non-transitory computer storage medium storing instructions that are operative, when executed on the processor, to perform the methods described herein.

EXAMPLE NETWORKS FOR IMPLEMENTATION OF THE EMBODIMENTS

Figure 1A:
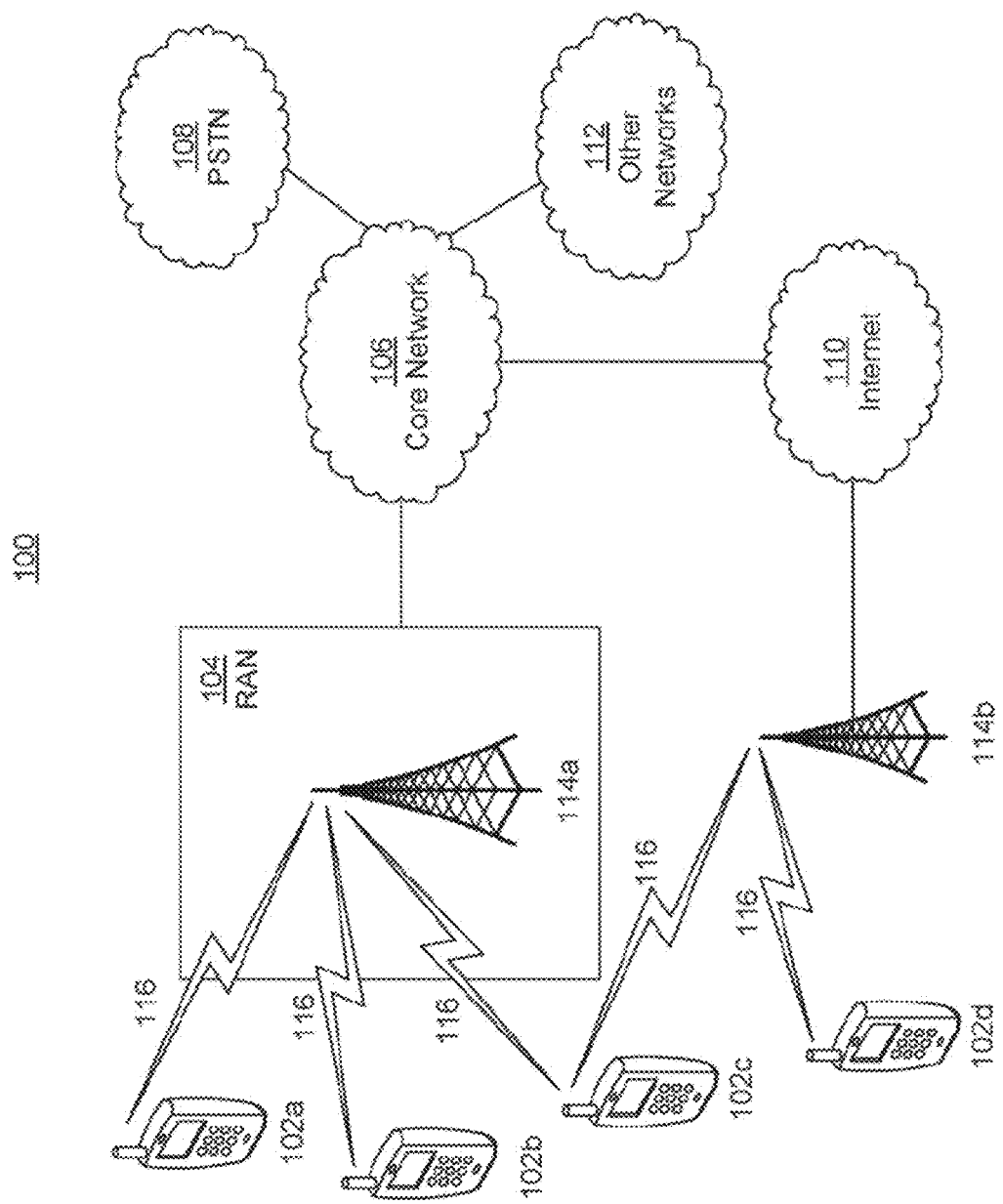
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
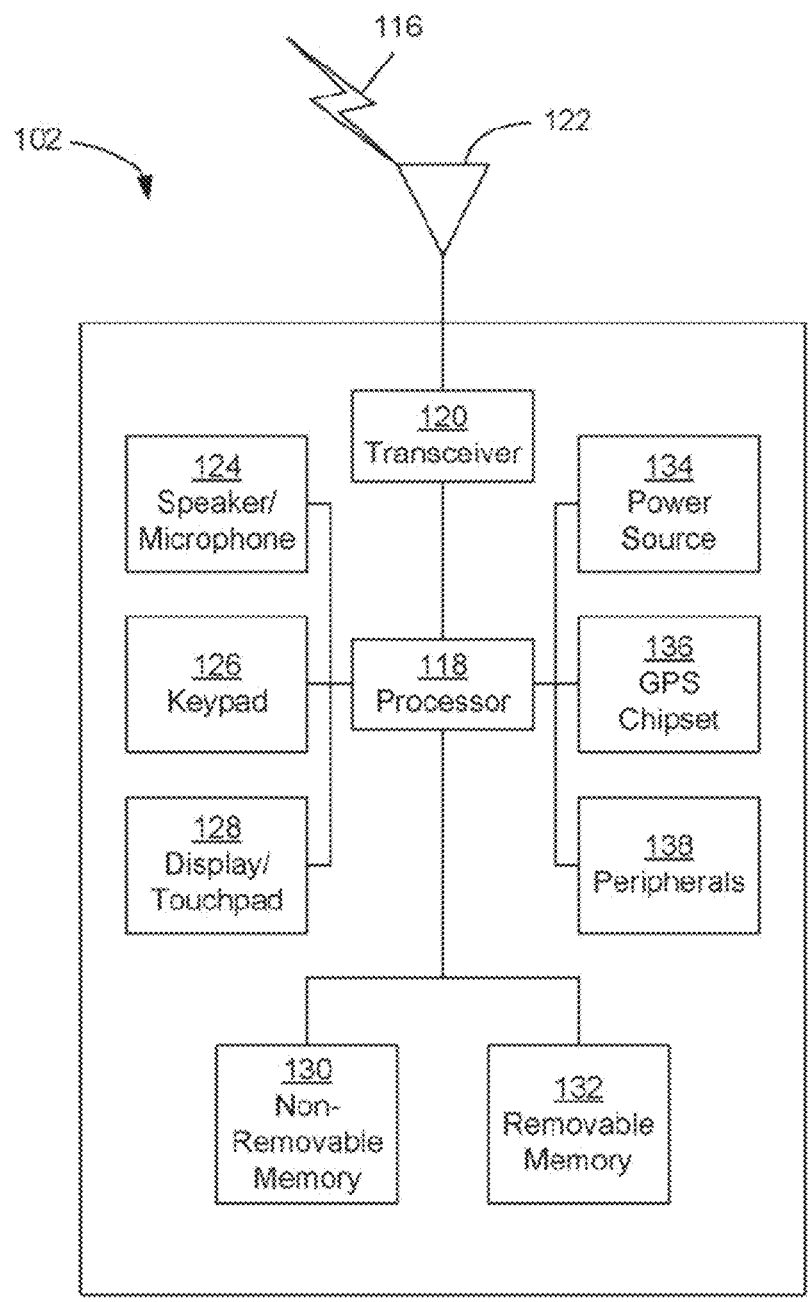
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In view of FIGS. 1A-1B, and the corresponding description of FIGS. 1A-1B, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Block-Based Hybrid Video Coding.

Figure 2:
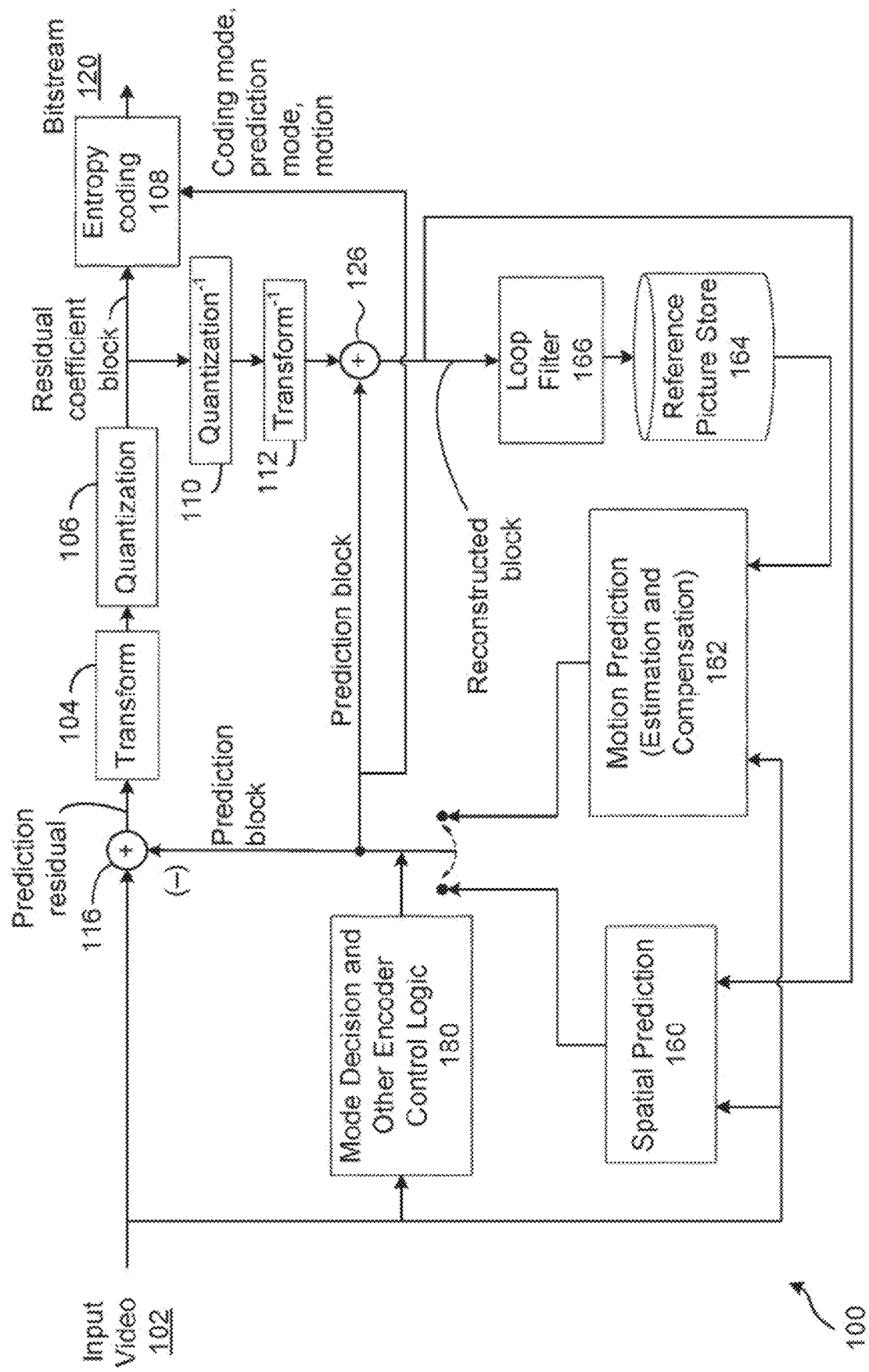
FIG. 2 illustrates an example block-based video encoder.

Like the HEVC Test Model (HM), the Joint Exploration Model (JEM) software is also built upon the block-based hybrid video coding framework (100). FIG. 2 illustrates a block diagram of a block-based hybrid video encoding system. Note that in the present application, the terms "reconstructed" and "decoded" may be used interchangeably. Usually, but not necessarily, the term "reconstructed" is used at the encoder side while "decoded" is used at the decoder side.

Before being encoded, the video sequence may go through pre-processing, for example, applying a color transform to the input color picture (e.g., conversion from RGB 4:4:4 to YCbCr 4:2:0), or performing a remapping of the input picture components in order to get a signal distribution more resilient to compression (e.g., using a histogram equalization of one of the color components). Metadata may be associated with the pre-processing, and attached to the bitstream.

The input video signal 102 is processed block by block. The HEVC specification distinguishes between "blocks" and "units," where a "block" addresses a specific area in a sample array (e.g., luma, Y), and the "unit" includes the collocated blocks of all encoded color components (e.g., Y, Cb, Cr, or monochrome), syntax elements, and prediction data that are associated with the blocks (e.g., motion vectors). In the present application, the term "block" can be used to refer to an array of data of various sizes, and it may be used to refer to a macroblock and a partition as specified in H.264/AVC, any of a coding tree unit (CTU), a coding unit (CU), a prediction unit (PU), a transform unit (TU), a coding block (CB), a prediction block (PB), and a transform block (TB) as in HEVC, a superblock or sub-partitioning in AV1, a CTU, CU, TU, CB, and TB as in VVC (Versatile Video Coding) or other video coding standards.

In HEVC, extended block sizes are used to efficiently compress high resolution (1080p and beyond) video signals. In HEVC, a CU can be up to 64×64 pixels. A CU can be further partitioned into prediction units, for which separate prediction methods are applied. For each input video block (MB or CU), spatial prediction (160) and/or temporal prediction (162) may be performed.

Spatial prediction (or "intra prediction") uses pixels from the samples of already-coded neighboring blocks (which are called reference samples) in the same video picture/slice to predict the current video block. Spatial prediction reduces spatial redundancy inherent in the video signal.

Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally; and the reference index is used to identify from which reference picture in the reference picture store (164) the temporal prediction signal comes.

After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106).

The encoder decodes an encoded block to provide a reference for further prediction. The quantized residual coefficients are inverse quantized (110) and inverse transformed (112) to form the reconstructed residual, which is then added back to the prediction block (126) to form the reconstructed video block.

The encoder may also skip the transform and apply quantization directly to the non-transformed residual signal. The encoder may also bypass both transform and quantization, i.e., the residual is coded directly without the application of the transform or quantization process. In direct pulse code modulation (PCM) coding, no prediction is applied and the coding unit samples are directly coded into the bitstream.

Further in-loop filtering such as de-blocking filter, SAO (Sample Adaptive Offset) filter and Adaptive Loop Filters may be applied (166) to the reconstructed video block before it is put in the reference picture store (164) and used to code future video blocks. To form the output video bitstream 120, coding mode (inter or intra), prediction mode information, motion information, and quantized residual coefficients are all sent to the entropy coding unit (108) to be further compressed and packed to form the bitstream.

Figure 3:
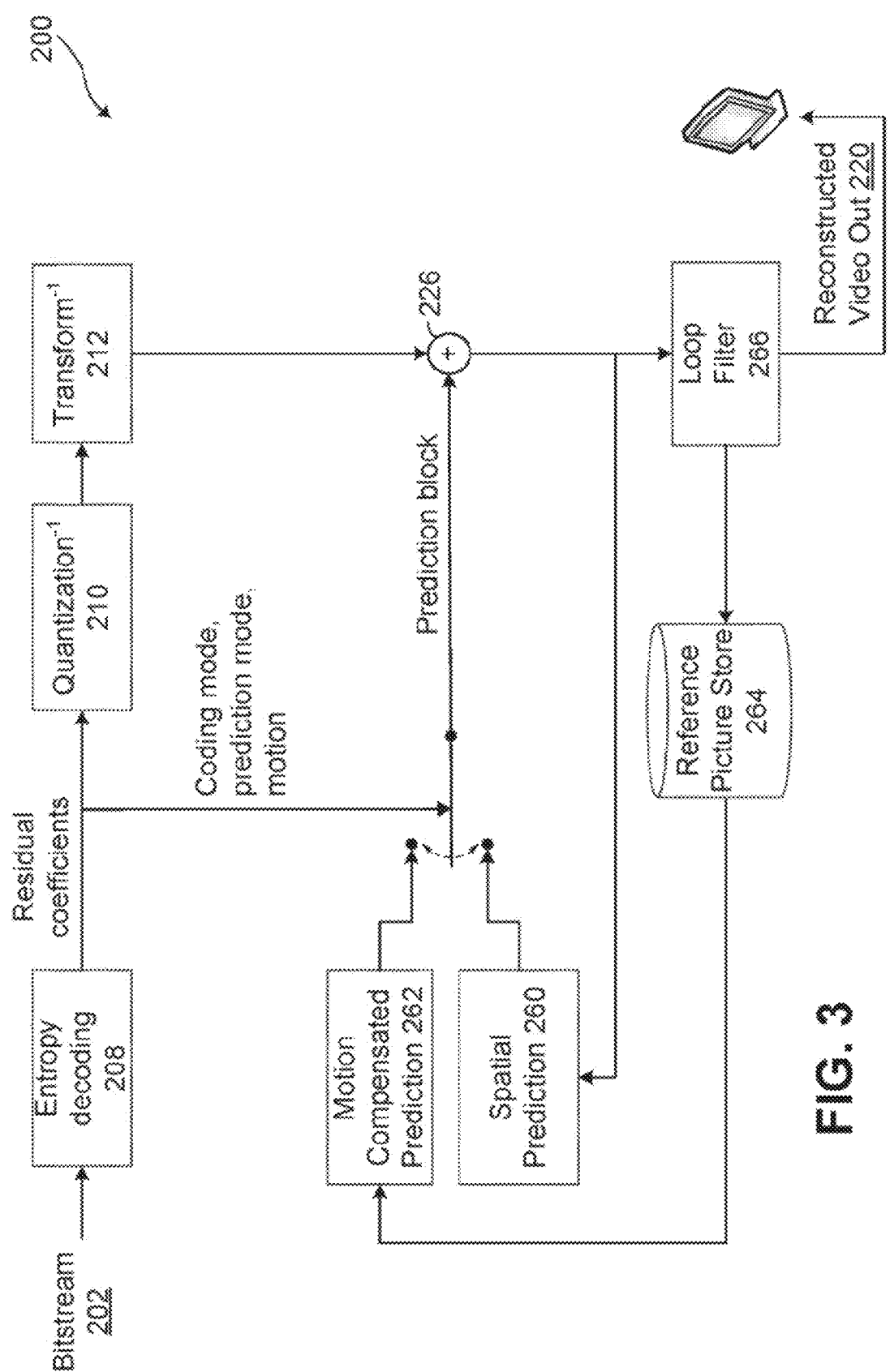
FIG. 3 illustrates an example block-based video decoder.

FIG. 3 illustrates a general block diagram of a block-based video decoder (200). A video decoder generally performs a decoding pass reciprocal to the corresponding encoding pass, which performs video decoding as part of encoding video data. The video bitstream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering (266) before it is stored in reference picture store 264. The reconstructed video (220) in the reference picture store may then be stored, transmitted or used to drive a display device, as well as used to predict future video blocks.

The decoded picture may further go through post-processing, for example, an inverse color transform (e.g., conversion from YCbCr 4:2:0 to RGB 4:4:4) or an inverse remapping performing the inverse of the remapping process performed in the pre-encoding processing. The post-processing may use metadata derived in the pre-encoding processing and signaled in the bitstream.

Both HEVC and the JEM adhere to the block-based motion compensated hybrid video encoding/decoding workflows as shown in FIG. 2 and FIG. 3 and are based on the same functional modules such as spatial prediction (i.e., intra prediction), temporal prediction (i.e., inter prediction), transform, quantization, entropy coding and loop filters. However, several inter coding modules, especially the ones associated with motion compensated prediction, are further extended and improved.

Template-Based Inter Prediction Techniques.

In HEVC, coding parameters used for inter prediction (e.g., motion vectors (MVs), reference index, weighted prediction parameters) are determined at the encoder by rate-distortion (R-D) optimization and are signaled to the decoder. Therefore, the overhead used to code those inter coding parameters could account for a non-negligible portion of the output bitstream. To avoid signaling those parameters, two template-based inter prediction techniques are applied in the JEM by deriving those inter coding parameters at the decoder based on template samples, e.g., the reconstructed neighboring samples of a current block that are previously decoded. The first method is called local illumination compensation (LIC). LIC compensates the motion compensated prediction based on a scaling and an offset that are derived based on the template samples to address the local illumination change issue between different pictures. The second method is called frame-rate up conversion (FRUC) template mode, in which the motion information (MVs and reference indices) is derived at the decoder based on template matching.

In addition to LIC and FRUC, other template-based methods have also been proposed to be applied both to inter prediction and to residual coefficient signaling. In those methods, the reconstructed neighboring samples are used for the decoding of a current block. In the following, aspects of those template-based coding methods are also briefly described.

Local Illumination Compensation.

Figure 4:
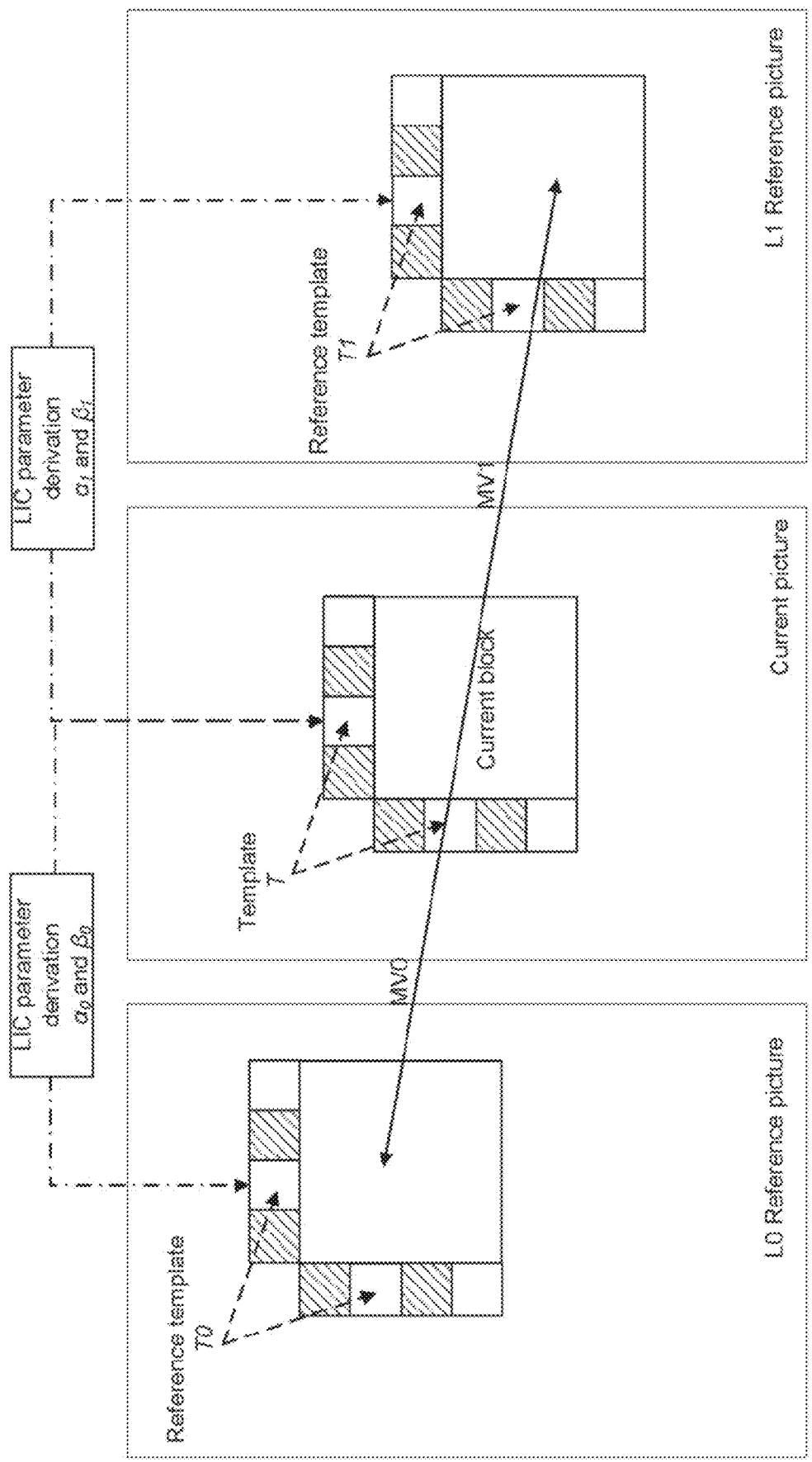
FIG. 4 illustrates local illumination compensation.

LIC is a coding tool that is used in the JEM to address the issue of local illumination changes that exist in temporal neighboring pictures, as described in J. Chen, E. Alshina, G. J. Sullivan, J. R. Ohm, J. Boyce, "Algorithm description of Joint Exploration Test Model 7 (JEM7)", JVET-G1001, July 2017, Torino, Italy. LIC is based on a linear model where a scaling factor and an offset are applied to the reference samples to obtain the prediction samples of a current block. Specifically, the LIC can be mathematically modeled by the following equation:

$$P(x, y) = \alpha \cdot P_r(x + v_x, y + v_y) + \beta \quad (1)$$

where P(x, y) is the prediction signal of the current block at the coordinate (x, y); $P_r$ (x+$v_x$, y+$v_y$) is the reference block pointed by the motion vector ($v_x$, $v_y$); α and β are the corresponding scaling factor and offset that are applied to the reference block. FIG. 4 illustrates the LIC process. In FIG. 4, when LIC is applied to a video block, a linear least mean square error (LLMSE) method is employed to derive the values of the LIC parameters (α and β) by minimizing the difference between the neighboring samples of the current block (the template T in FIG. 4) and their corresponding reference samples in the temporal reference pictures (i.e., either T0 or T1 in FIG. 4), e.g., $$\alpha_{0/1} = \frac{N \cdot \sum_{i=1}^{N} (T(x_i, y_i) \cdot T_{0/1}(x_i + v_x^{0/1}, y_i + v_y^{0/1})) - \sum_{i=1}^{N} (T(x_i, y_i)) \cdot \sum_{i=1}^{N} (T_{0/1}(x_i + v_x^{0/1}, y_i + v_y^{0/1}))}{N \cdot \sum_{i=1}^{N} (T(x_i, y_i) \cdot T_{0/1}(x_i + v_x^{0/1}, y_i + v_y^{0/1})) - \left(\sum_{i=1}^{N} T_{0/1}(x_i + v_x^{0/1}, y_i + v_y^{0/1})\right)^2} \quad (2)$$

$$\beta_{0/1} = \frac{\sum_{i=1}^{N}(T(x_i, y_i)) - \alpha_{0/1} \cdot \sum_{i=1}^{N}(T_{0/1}(x_i + v_x^{0/1}, y_i + v_y^{0/1}))}{N} \quad (3)$$

where N represents the number of template samples that are used for deriving the LIC parameters; T ($x_i$, $y_i$) is the template sample of the current block at the coordinate ($x_i$, $y_i$); and $T_{0/1}(x_i+v_x^{0/1}, y+_y^{0/1})$ is the corresponding reference sample of the template sample based on the motion vector (either L0 or L1) of the current block. Additionally, to reduce the computational complexity, both the template samples and the reference template samples may be subsampled (2:1 subsampling) to derive the LIC parameters, e.g., only the shaded samples in FIG. 4 may be used to derive α and β.

Template-Matching Based Frame-Rate Up Conversion.

Figure 5:
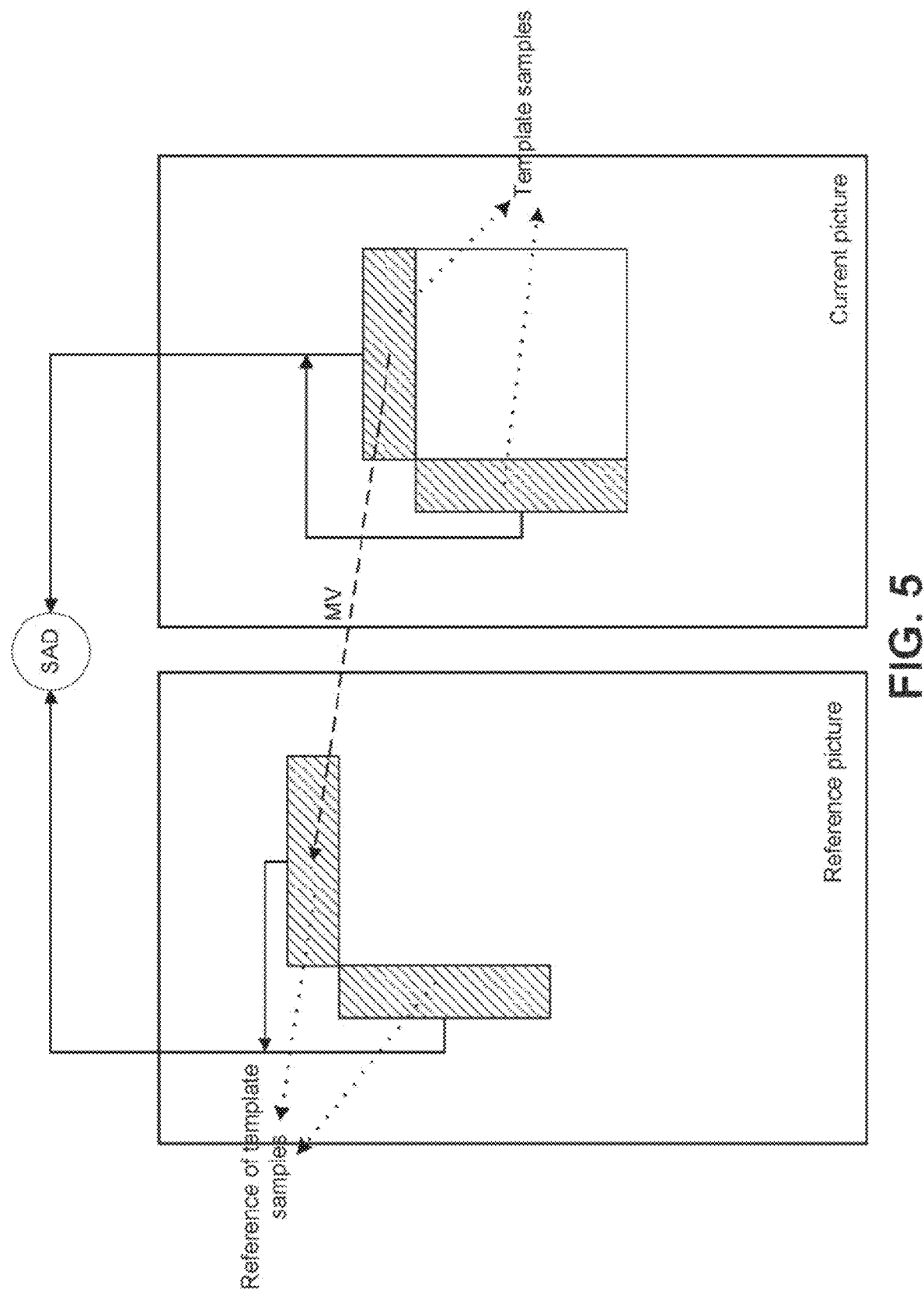
FIG. 5 illustrates an example of template-matching based on frame-rate up-conversion (FRUC).

To reduce the overhead of signaling motion information, FRUC is supported for inter blocks in the JEM. When the FRUC is enabled, both the MVs and the reference picture indices of the current block are not signaled; instead, they are generated at the decoder side. Specifically, for FRUC motion derivation, a set of preliminary MV candidates generated from the spatial and temporal neighbors of the current block are checked and the candidate that leads to the minimum sum of absolute difference (SAD) is selected as the initial MV. Then, a local search around the initial MV is performed and the MV with the minimum SAD is used as the MV for the whole block. In the existing FRUC, two search algorithms are supported, including template-matching and bilateral-matching. In template-matching, the top and/or left decoded neighboring samples (without in-loop filters being applied) of the current block are used to derive the motion information of the block by finding the MV which provides the best match between the template and its corresponding block (e.g., a corresponding block having the same size as the template) in a reference picture. FIG. 5 illustrates the template-matching based FRUC.

Sign Prediction of Transform Coefficients.

In some template-based coding methods, a sign-prediction method is applied to reduce the overhead of signaling signs for transform coefficients. Examples of such methods are described in Y.-W. Chen, et al., "Description of SDR, HDR and 360° video coding technology proposal by Qualcomm and Technicolor—low and high complexity versions", JVET-J0021, April 2018, San Diego, USA; and in A. Alshin et al., "Description of SDR, HDR and 360° video coding technology proposal by Samsung, Huawei, GoPro, and HiSilicon—mobile application scenario", JVET-J0024, April 2018, San Diego, USA.

Figure 6:
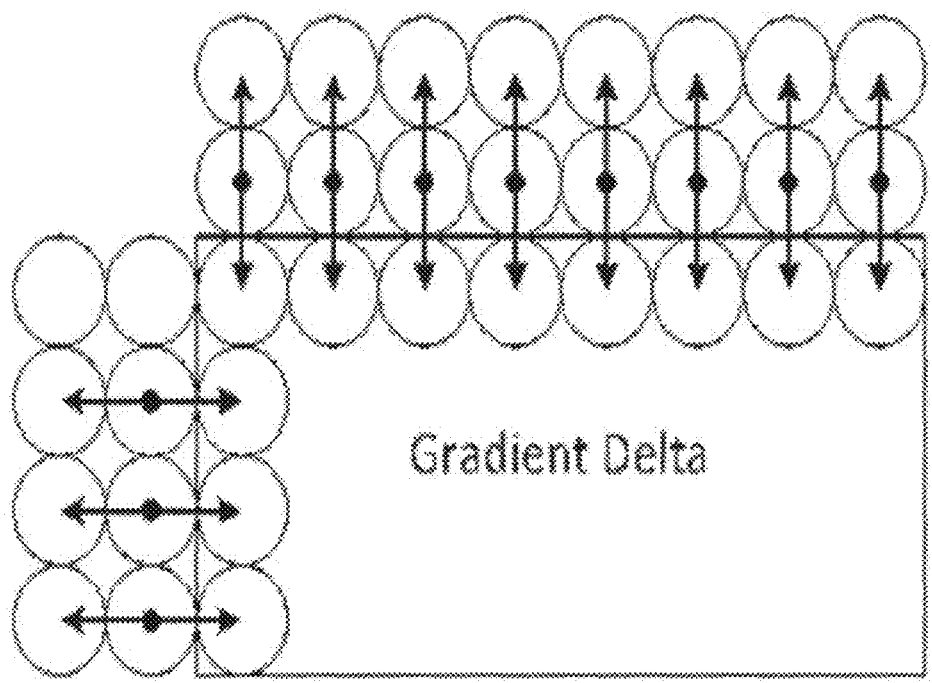
FIG. 6 illustrates samples used for calculation of boundary discontinuity for use in predicting the sign of transform coefficients.

Sign prediction methods operate to perform multiple inverse transforms on the transform coefficients of a coding block. For each inverse transform, the sign of a non-zero transform coefficient is set to either negative or positive. The sign combination which minimizes a cost function is selected as the sign predictor to predict the signs of the transform coefficients of the current block. For one example to illustrate this idea, assuming the current block contains two non-zero coefficients, there are four possible sign combinations, namely, (+, +), (+, −), (−, +) and (−, −). For all four combinations, the cost function is calculated and the combination with the minimum cost is selected as a sign predictor. The cost function in this example is calculated as a discontinuity measurement of the samples sitting on the boundary between the current block and its causal neighbors. As shown in FIG. 6, the cost function is calculated as the sum of absolute second derivatives of the boundary samples of the current block and the reconstructed neighboring samples above and left to the current block as follows:

$$\text{cost} = \sum_{x=0}^{w} |(-R_{x,-1} + 2R_{x,0} - P_{x,1}) - r_{x,1}| + \quad (4)$$
$$\sum_{y=0}^{h} |(-R_{-1,y} + 2R_{0,y} - P_{1,y}) - r_{1,y}|$$

where $R_{x,y}$ is the reconstructed neighboring sample, $P_{x,y}$ is prediction of the current block, and $r_{x,y}$ is the residual hypothesis, at the coordinate (x, y).

Motion Vector Difference Sign Derivation.

Figure 7:
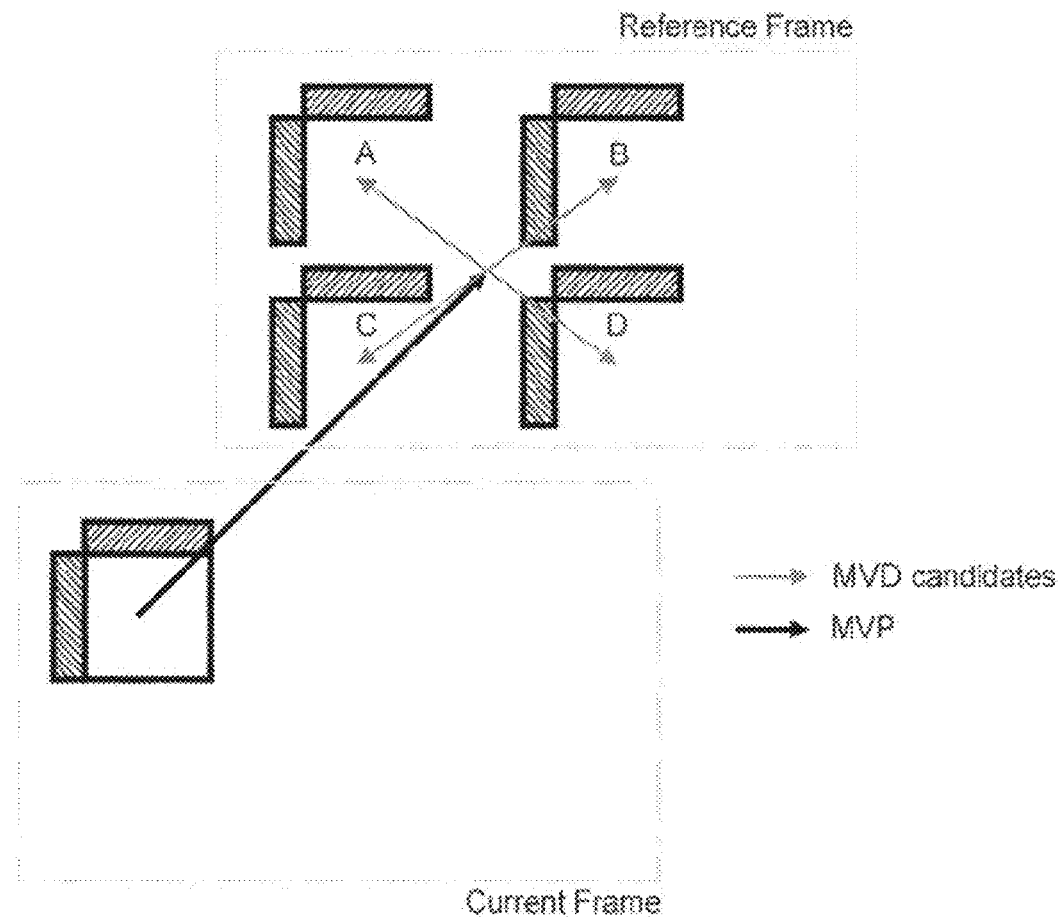
FIG. 7 illustrates motion vector difference candidates used in an example of motion vector difference sign derivation.

Template-matching techniques have also been proposed for reducing the signaling of the signs for motion vector difference (MVD). In one such technique, based on the absolute values of the received MVD, a list of MVD candidates is generated by using different combinations of the sign values for each of horizontal and vertical MVD. Then, the cost of each MVD candidate is calculated using the template samples (the reconstructed neighboring samples) of the current block. The MVD candidates are sorted based on the calculated cost values. The final MVD is selected by sending an index in the sorted candidate list from the encoder to the decoder. FIG. 7 shows one example to illustrate the idea of motion vector difference sign derivation, where A, B, C and D are four possible MVD candidates which are generated by assigning different sign values for the received absolute MVD values. An index is signaled to identify one of the four candidates, and the identified candidate is used to reconstruct the final MVs of the current block.

Template-Matching Based Motion Vector Prediction.

In some implementations, for each regular inter-coded block in HM and JEM, two motion vector predictor (MVP) candidates are generated, and the candidate with the best prediction quality is selected by signaling an MVP index from encoder to decoder. In Y.-W. Chen et al. (supra), a template-based MVP derivation method is used to avoid the MVP signaling. Specifically, template matching is used to derive the MVP at decoder side. First, the two default MVP candidates are checked, and the candidate which leads to the smaller SAD between the template and its reference is selected as the starting point. Then a local search based on template matching around the starting point is performed and the MV which results in the minimum matching cost is selected as the MVP for the current block.

Motion Candidate Reorder.

In C.-W. Hsu et al., "Description of SDR video coding technology proposal by MediaTek", JVET-J0018, April 2018, San Diego, USA, a motion candidate reorder method is used to improve the efficiency of merge mode. Specifically, after the initial merge candidate list is generated, the original merge candidates in the list are reordered based the template-matching costs that are calculated between the template samples of the current CU and the corresponding reference samples of the template using the motion of a merge candidate. After the reordering, the merge candidates with smaller costs can be put in front of the merge candidates with larger costs. By this way, the signaling efficiency of merge candidate indices can be improved by spending fewer bits on merge candidates which provide better prediction quality.

Transform Syntax Reorder.

When enhanced multiple transform (EMT) and/or non-separable secondary transform (NSST) are used, a transform syntax reorder has been proposed in C.-W. Hsu et al. (supra) for use in reordering the indices of multiple transforms that can be selected, for example, based on the same cost function as used for the sign prediction of transform coefficients (as described above in the section "Sign prediction of transform coefficients") using the reconstructed neighboring samples of the block. The possible EMT and/or NSST transform candidates are reordered based on the costs and the ones with smaller costs will be assigned with short codewords.

Overlapped Block Motion Compensation.

Figure 8:
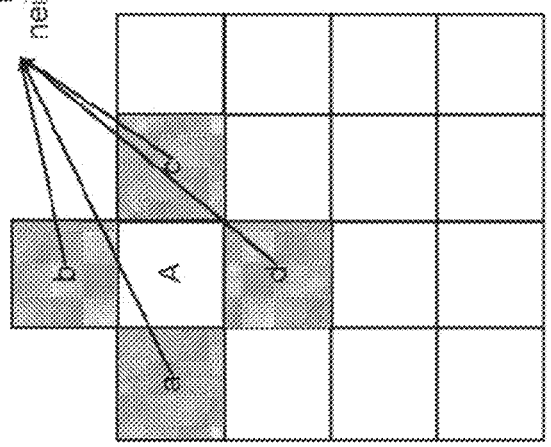
FIG. 8 illustrates an overlapped block motion compensation (OBMC) process for sub-block modes, where OBMC is applied to all the sub-CU blocks (e.g. sub-CU block A) using MVs from all four neighboring blocks (e.g. shaded sub-CU block a, b, c, d).

Overlapped block motion compensation (OBMC) is used in the JEM reference software to remove the blocking artifacts at the motion compensation stage. In the JEM, OBMC is performed for all inter block boundaries except the right and bottom boundaries of a block. Additionally, when a block is divided into multiple sub-blocks and each sub-block is associated with its own MV (e.g., the FRUC blocks), the OBMC is also performed for every sub-block boundary. FIG. 8 illustrates the concept of the OBMC. Specifically, when the OBMC is applied to a sub-block (e.g., the sub-block A in FIG. 8), in addition to the MV of the current sub-block, the MVs of four neighboring sub-blocks are also used to derive the prediction signals of the current sub-block. Then, the multiple prediction signals using the MVs of neighboring sub-blocks are averaged to generate the final prediction of the current sub-block.

Adaptive Multiple Core Transform.

In addition to DCT-II and DST-VII core transforms that are used in HEVC, an adaptive multiple transform (AMT) tool is used for coding the residuals of both inter and intra blocks in the JEM. Specifically, the AMT introduces four additional core transforms from the DCT/DST transform family, including DCT-VIII, DCT-V, DST-VII and DST-I. The AMT is applied to all the coding blocks whose width and height are no larger than 64, and a flag is signaled to indicate whether the AMT is enabled or not. When the flag is equal to 0, it indicates that DCT-II is used as the transform for the block; otherwise (i.e., the flag is equal to 1), three transform subsets (each containing two different AMT core transforms as specified in Table 1) are defined. When the AMT is applied to an intra block, a transform subset is firstly selected based on the intra prediction direction of the block. Then, two additional flags are signaled to indicate which transform (out of the two core transforms in the selected transform subset) is used as the horizontal transform and the vertical transform respectively. For inter blocks, only the transform subset #0, which consists of DCT-VIII and DST-VII, is used.

TABLE 1

The three transform subsets defined in the JEM.

| Transform subset No. | Core transforms |
|---|---|
| 0 | DST-VII, DCT-VIII |
| 1 | DST-VII, DST-I |
| 2 | DST-VII, DCT-V |

Mode-Dependent Non-Separable Secondary Transform.

As the correlation between spatial neighboring samples is generally less than that in the temporal domain, there are often strong correlations within the residual samples generated by intra prediction. To further improve intra coding efficiency, a tool called mode-dependent non-separable secondary transform (NSST) is applied in the JEM by applying non-separable transforms to transform coefficients of intra blocks. Specifically, if both the width and the height of a block are no smaller than 8, an 8×8 non-separable transform is applied to the top-left 8×8 region of the 2D transform coefficient array of the block; otherwise (i.e., either the width or the height is equal to 4 which is the minimum coding block size in the JEM), a 4×4 non-separable transform is applied to the top-left region (in the size of min(8, W)×min(8, H)) of the transform coefficients of the block. To illustrate the NSST, it assumes the input X is a 4×4 block, as specified as $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

To apply the NSST, the input block is translated into a vector as $$\vec{X} = [X_{00}\ X_{01}\ X_{02}\ X_{03}\ X_{10}\ X_{11} \quad (5)$$
$$X_{12}\ X_{13}\ X_{20}\ X_{21}\ X_{22}\ X_{23}\ X_{30}\ X_{31}\ X_{32}\ X_{33}]^T$$

Then, the NSST is applied by $\vec{F}=T\cdot\vec{X}$, where $\vec{F}$ indicates the transform coefficient vector, and T is a 16×16 NSST transform matrix. The 16×1 coefficient vector $\vec{F}$ is re-organized as 4×4 block using the scanning order for that block (horizontal, vertical or diagonal). In the JEM, instead of using matrix multiplications, a hypercube-givens transform (HyGT) based on butterfly implementation is used to reduce the computational complexity of non-separable transform.

Issues Addressed in Exemplary Embodiments.

Like its predecessors, the HEVC standard employs motion compensated prediction (MCP) to efficiently reduce the temporal redundancy between pictures, thus achieving high inter coding efficiency. Because MCP only uses the samples from already-decoded pictures to predict the samples in the current picture, there is no dependency between the MCPs of spatial neighboring blocks. This means that the MCPs of the inter blocks in the same picture/slice are independent from each other. Thus, the decoding processes of multiple inter blocks in the current picture can be done in parallel, e.g., they can be assigned to different threads to exploit the parallelism.

As described above, some template-based inter prediction methods (e.g., template-matching based FRUC and LIC) are applied in the JEM. To avoid signaling coding parameters, the template-based inter prediction methods derive those parameters at both encoder and decoder using the already-reconstructed samples of the spatial neighbors of the current block. Thus, when a block is coded by one of those template-based inter prediction techniques, its decoding process waits until the samples of its neighboring blocks (the template samples of the current block) are fully reconstructed. This can complicate the pipeline design, especially at the decoder side, therefore leading to significant complexity increase for the hardware implementation.

Figure 9:
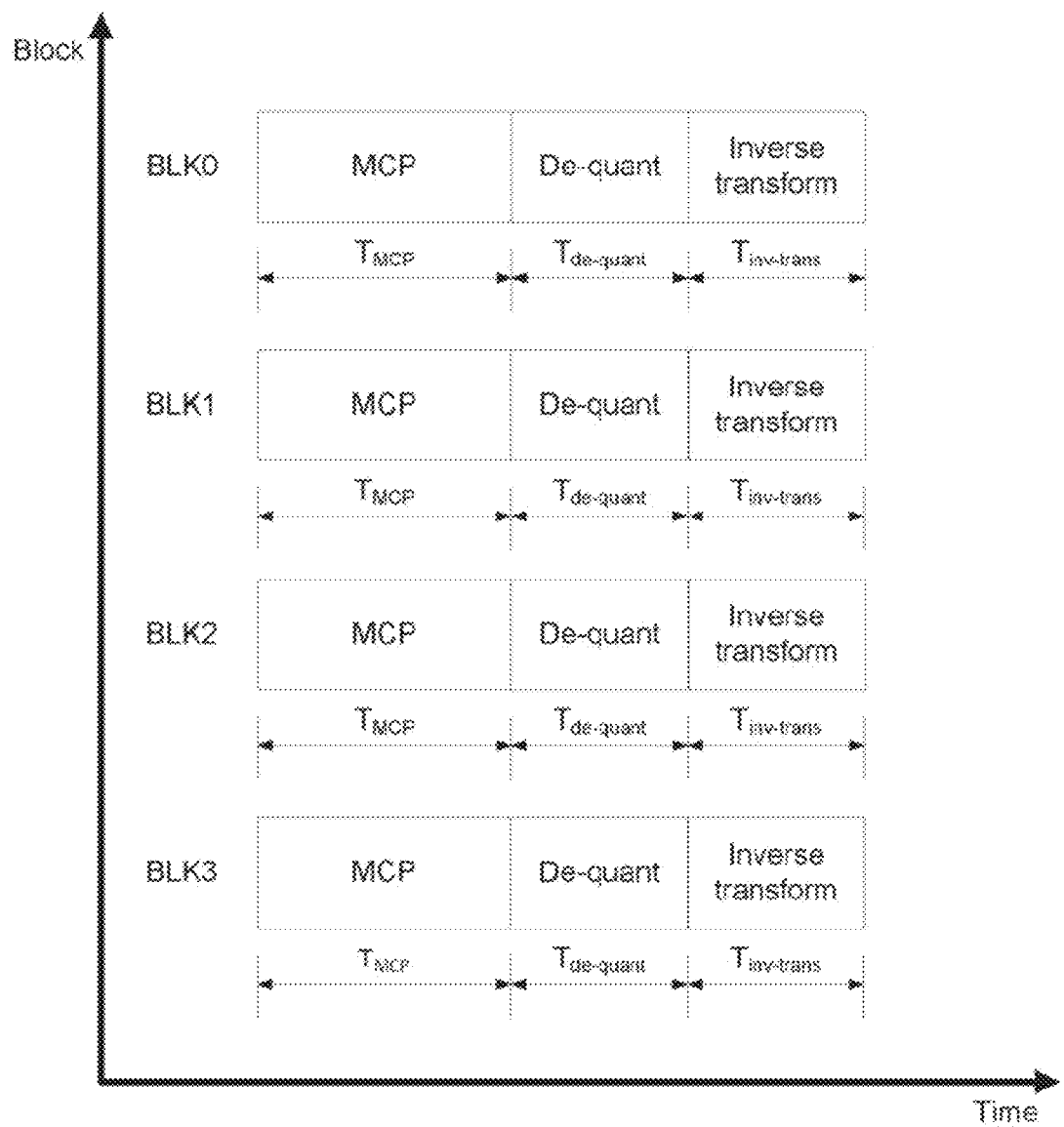
FIG. 9 illustrates an example of parallel decoding by an HEVC decoder.
Figure 10:
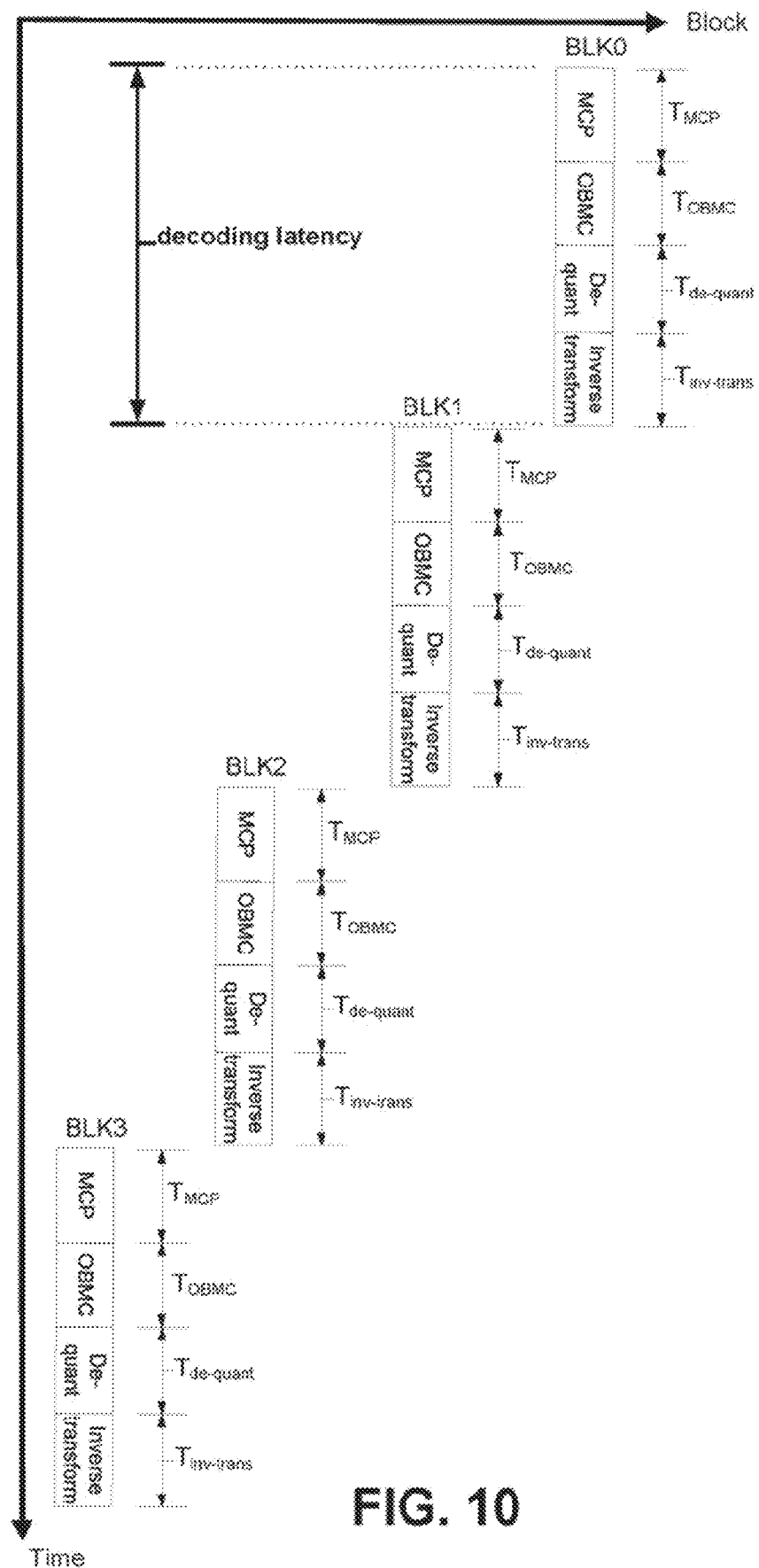
FIG. 10 illustrates an example of decoding latency in the JEM.

To understand the parallel processing issue caused by template-based inter prediction methods, FIG. 9 and FIG. 10 show examples to compare the decoding processes of HEVC and the JEM. To facilitate the explanation, four consecutive coding blocks of equal block-size in the picture are used as examples, each coding block being decoded by a separate decoding thread, and the decoding complexity of each individual decoding module (e.g., the MCP, the OBMC, the dequantization and the inverse transform) is assumed to be the same for these four coding blocks. Additionally, it is assumed that all the coding blocks in the example of the JEM are coded based on one of the template-based inter prediction techniques. In FIG. 9 and FIG. 10, the blocks represent the decoding process of the MCP, the OBMC, the de-quantization and the inverse transform, and the variables $T_{MCP}$, $T_{OBMC}$, $T_{de-quant}$ and $T_{inv-trans}$ are the decoding times of those four modules. As shown in FIG. 9, because the four coding blocks can be decoded in parallel, the total decoding time of the HEVC is equal to the decoding time of one coding block, i.e., $T_{MCP}+T_{de-quant}+T_{inv-trans}$.

Due to the dependency introduced by the template-based prediction techniques, for the decoding process of the JEM (as shown in FIG. 10), the decoding of each individual coding block cannot be invoked until its spatial neighboring blocks are fully reconstructed. Therefore, the total decoding time of the JEM is equal to the summation of the decoding times of the four blocks, i.e., $T_{total}=4*(T_{MCP}+T_{OBMC}+T_{de-quant}+T_{inv-trans})$. Note that although the example in FIG. 10 assumes OBMC is used, the same latency issue exists even when OBMC is not used. Generally speaking, reconstruction of inter coded blocks in HEVC can be performed independent of each other, as the MCP process in HEVC only requires samples from reference pictures, which are fully reconstructed already. This means that it is easy to parallelize the reconstruction of inter blocks in HEVC. By contrast, the use of template-based methods such as FRUC and LIC in the JEM introduces dependency among neighboring inter coded blocks. If an inter block is coded using one of these modes, the MCP of this block cannot be started until its neighboring blocks are fully reconstructed, therefore significantly increasing the latency.

Overview of Embodiments

To address latency issues described above, methods are described herein for reducing the encoding/decoding latency of the template-based inter prediction methods while maintaining its main coding gain. In the proposed methods, some of the functions of template-based inter prediction methods remain the same as in existing designs. For example, for LIC, the parameter derivation and the linear sample adjustment processes remain the same; and for FRUC, the template-matching based motion search process remains the same. However, the generation of the template samples used by the template-based inter prediction is modified to lower the dependency between neighboring blocks such that the overall encoding/decoding latency due to the template-based inter prediction is reduced. Specifically, compared to the existing template-based methods in the JEM, changes proposed in this disclosure include those described below.

As compared to the existing template-based inter prediction methods in the JEM, where the reconstructed neighboring samples are used for deriving the coding parameters, it is proposed to use the prediction signal (i.e., the prediction samples generated from the MCP and, if applicable, OBMC) of the spatial neighbors as the template samples for the current block. In this way, the encoding/decoding of a template-based coding block can be invoked as soon as the prediction signal of its neighboring blocks becomes available. Using only a prediction signal as template may be less accurate than the fully reconstructed signal, because the reconstructed residual has not been added yet. This may result in some coding performance degradation. To reduce performance loss, additional methods are proposed to further improve the coding performance of template-based inter prediction when the prediction signal is used as the source of template samples.

To reduce the latency of template-based inter prediction, it is further proposed to divide a picture/slice into multiple "template slices" such that the decoding of inter blocks within a template slice can be performed independently from other template slices. To achieve such parallelism, it is proposed to disallow a coding block from using the samples that are not in the same template slice of the block as the template samples. Additionally, to reduce the potential coding loss, template slices only break the template sample dependency but still allow the other coding processes (e.g., in-loop filters, intra prediction, advanced motion vector prediction (AMVP) and so forth) to operate across template slice boundaries.

Without loss of generality, in the following discussion, the template-matching based FRUC and LIC are used as examples to explain the proposed methods. However, the schemes to be described are also applicable to other template-based coding schemes in which the reconstructed neighboring samples of a block are used during the encoding and/or decoding process.

Template-Based Inter Prediction Based on Prediction Signal.

As pointed out above, as compared to HEVC, using the reconstructed neighboring samples as the template for the template-based inter prediction methods is unfriendly to the parallel encoding/decoding for codec implementation, because the encoding/decoding of a template-based coding block needs to wait until all its causal neighboring samples are fully reconstructed through the MCP, the OBMC (if applicable), the de-quantization and the inverse transform.

To reduce the encoding/decoding latency, in one embodiment of the disclosure, it is proposed to perform template-based inter prediction based on the prediction signal, instead of the fully-reconstructed signal, from the neighboring blocks. In one embodiment, instead of using the reconstructed neighboring samples, the prediction samples of the spatial neighboring blocks are used as the template for the current block in the FRUC motion search, LIC parameter derivation, and/or other template-based parameter derivation. Based on such design, the encoding/decoding of a template-based coding block can be started right after the prediction signal of its neighboring blocks are generated without waiting for the reconstruction of the residuals of the neighboring blocks. This may lead to significant latency reduction for the template-based inter prediction methods, given that the encoding/decoding latency caused by de-quantization and inverse transform of neighboring blocks are now removed.

Figure 11:
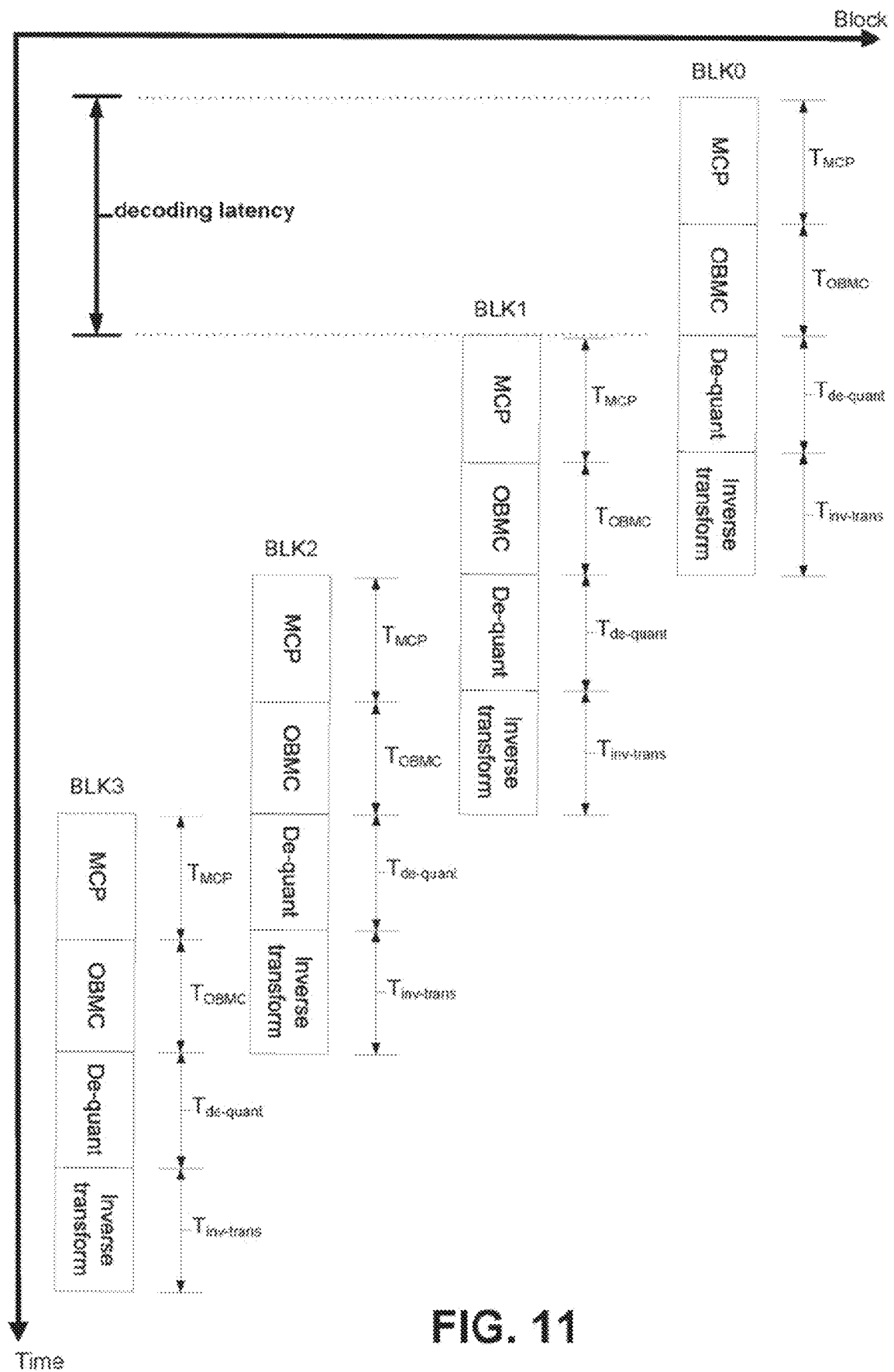
FIG. 11 illustrates decreased decoding latency by using the MCP samples (with the OBMC) as the template for template-based inter prediction techniques.

Based on the assumptions in FIG. 9 and FIG. 10, FIG. 11 illustrates the parallel decoding process when a method as proposed herein is applied to the template-based inter prediction methods. As shown in FIG. 11, because the decoding process of each template-based coding block can be immediately invoked after the inter prediction of its neighboring block, the decoding latency between two consecutive blocks is equal to the decoding time for generating the prediction signal of the first block, i.e., $T_{latency}=T_{MCP}+T_{OBMC}$. Thus, the total decoding time of the four coding blocks is now reduced to $T_{total}=4*(T_{MCP}+T_{OBMC})+T_{de-quant}+T_{inv-trans}$.

In FIG. 11, the OBMC is applied to generate the prediction samples of an inter block whose samples are then used as the template samples for deriving the corresponding coding parameters (e.g., the FRUC MVs and the LIC parameters) for its neighboring blocks. Though the OBMC can improve the prediction quality by removing the blocking artifacts due to the multiple motion compensations that are performed, it also introduces an encoding/decoding complexity increase, therefore resulting in non-negligible encoding/decoding latency when it is combined with the template-based inter prediction methods. On the other hand, because the OBMC only modifies the boundary samples of a coding block, its influence on the accuracy of the derived coding parameters is relatively low when considering its complexity increase for generating the prediction signal.

Figure 12:
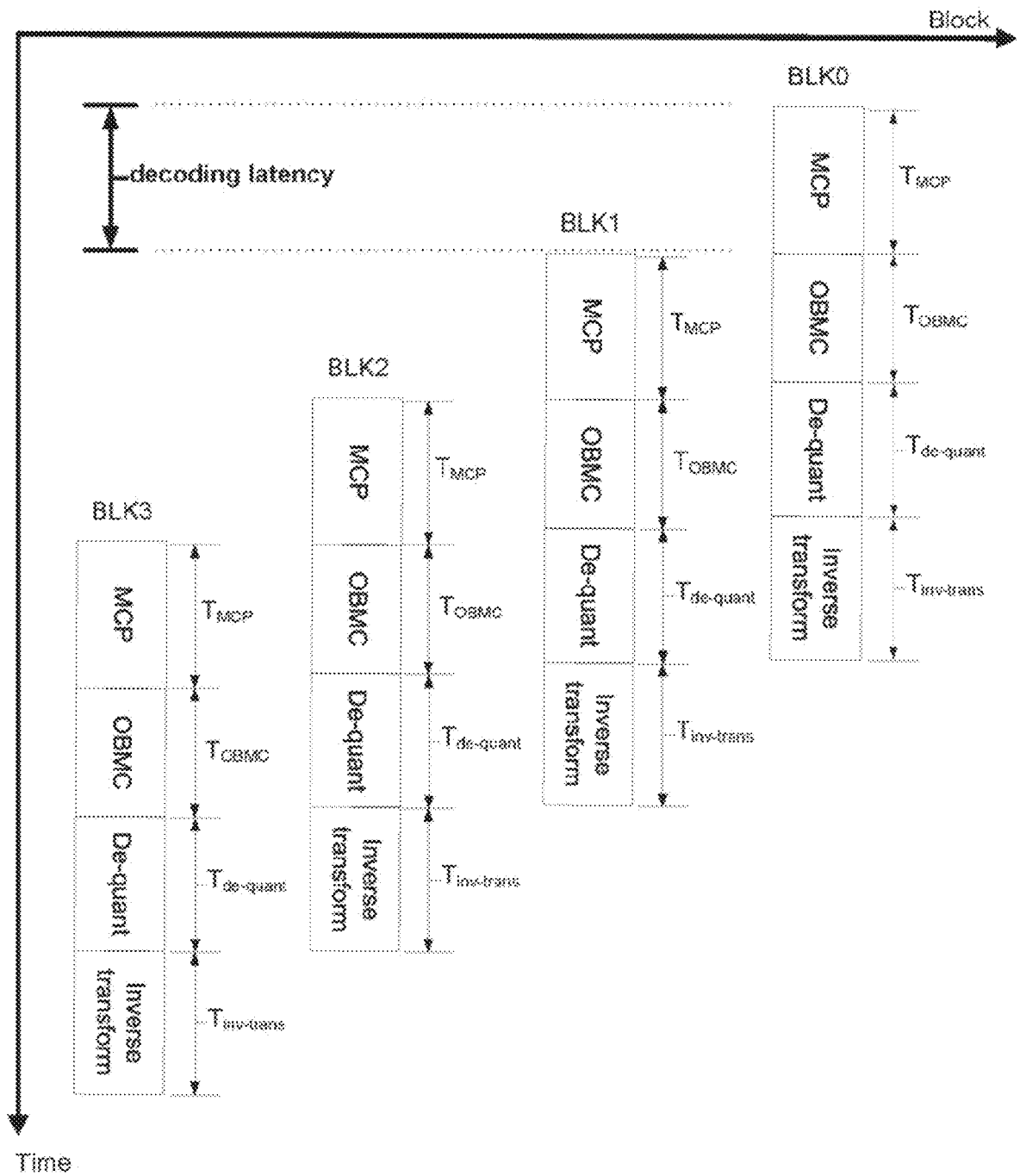
FIG. 12 illustrates decreased decoding latency by using the MCP samples (without the OBMC) as the template for template-based inter prediction techniques.

Therefore, to achieve a better performance/latency tradeoff, it is proposed in some embodiments to use the prediction signal generated before the OBMC as the template samples for the template-based inter prediction methods. FIG. 12 illustrates a parallel decoding process when the abovementioned method is applied to the template-based inter prediction. As shown in FIG. 12, because the decoding of each template-based block can be immediately started after the MCP of its neighbor is finished, the decoding latency between two neighboring blocks is further reduced to $T_{latency}=T_{MCP}$. Correspondingly, the total decoding time of the four coding blocks now become $T_{total}=4*T_{MCP}+T_{OBMC} T_{de-quant}+T_{inv-trans}$.

Note that in FIG. 11 and FIG. 12, it is assumed that OBMC is enabled for the current block and/or its neighboring blocks. This is just an example. The proposed prediction-signal-based template matching methods are equally applicable when OMBC is not enabled.

In some embodiments, the prediction samples of intra coded blocks can also be used as template samples for decoding the template-coded blocks. However, due to the fact that intra-coded blocks also use the reconstructed samples of their respective spatial neighbors to generate the prediction samples, such use of prediction samples may not be optimal for hardware design due to the propagated encoding/decoding latency from the neighboring intra-coded samples to the current template block. In some embodiments, for example, when using prediction samples for template-based methods as disclosed herein, prediction samples of neighboring blocks that are coded in intra modes are disabled for use as template samples of the current block. Specifically, in such embodiments, if a template sample is from an intra-coded neighboring block, it is treated as unavailable for the current block.

In FIG. 11 and FIG. 12, prediction samples (generated either after or before the OBMC is applied) are used to replace reconstructed samples as the template samples for the template-based inter prediction methods. Although the methods can significantly reduce the encoding/decoding latency, the differences between the prediction samples and the reconstructed samples (the reconstructed residual signal) could cause the coding parameters that are derived for the template-based inter prediction (e.g., motion vectors for FRUC or weight/offset parameters for LIC) to become less accurate, therefore leading to negative impacts on the overall coding performance. Additional methods are further proposed herein to compensate for the possible coding performance drop when the prediction signal is employed in the template-based inter prediction.

Template-Based Inter Prediction by Adaptively Enabling Prediction Samples Based on the Existence of Non-Zero Residuals.

Embodiments in which a prediction signal is used in template-based prediction can maintain much of the coding gain of template-based inter prediction, especially in cases where the reconstruction signal and the prediction signal are very similar. However, the use of the prediction signal may be less satisfactory when there are large prediction errors (i.e., non-zero residuals with large magnitudes) for the neighboring template samples. In another situation, if the neighboring template samples are coded with zero residuals, it is still reliable to use them as the template samples for the current block given that they are the same as the reconstructed samples.

In some embodiments, it is proposed to only use the prediction samples which are associated with zero residuals as the template samples when template-based inter prediction (e.g. FRUC and/or LIC) is applied. In some embodiments, the decision on whether a prediction sample has a non-zero residual or not is made based on the coded block flag (CBF) that is signaled in the bitstream, which indicates if a block contains non-zero transform coefficients or not. When the flag is equal to one, it means that there are non-zero residuals in the current block; therefore, its prediction samples may be less reliable for being used for the template-based inter prediction (and in this case the use of such prediction samples as template samples may be disabled). Otherwise (i.e., if the CBF is equal to 0), this signals that all residuals associated with the current block are zero; correspondingly, it is safe to use the prediction samples for the template-based inter prediction (and in this case the use of such prediction samples as template samples may be enabled).

Figure 13:
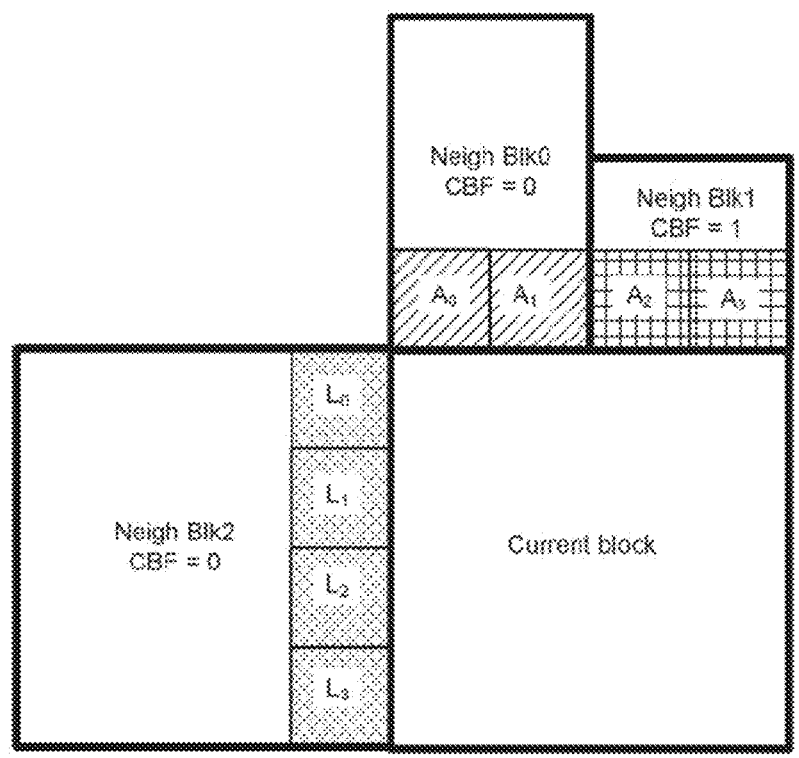
FIG. 13 illustrates examples of the template samples used for the template-based inter prediction.

FIG. 13 shows one example to illustrate such a method. In FIG. 13, the neighboring sample positions labeled as $A_0$ and $A_1$ and the neighboring sample positions labeled as L0 to L3 belong to an above neighboring block Blk0 and a left neighboring block Blk2, respectively, both having the CBF equal to 0. Since there is only zero residual for these two neighboring blocks, prediction samples at those positions labeled $A_0$ and $A_1$ and L0 through L3 can be used as the template samples in the template-based methods (e.g. FRUC and/or LIC). However, because the neighboring sample positions labeled as $A_2$ and $A_3$ are from the above neighboring block Blk1 whose CBF is equal to 1, the corresponding prediction samples may not be used as template samples in some embodiments; this is because they are different from the reconstructed sample values and therefore may be considered as less accurate.

In some such methods, the decision on whether residuals are all zero or not is made for each neighboring sample, and the decisions on the samples in the same template may be different from each other. Such sample-based differentiation may be unfriendly to practical hardware implementations, e.g., special attention may be needed for the FRUC SAD calculation and the LIC parameter derivation process where the samples in a template are treated differently based on whether they have residuals or not.

To avoid such complication, it is proposed to wholly enable/disable the samples of a template sub-region that is either above or left to the current block. Specifically, by such method, it allows the samples in a template sub-region (either the left template sub-region or the above template sub-region) of a block to be used as template samples only if all residuals associated with all the samples in that template sub-region are zero. Based on the same example in FIG. 13, as all the samples in the left template sub-region (i.e., $L_0$ to $L_3$) are from the same neighboring block whose CBF is 0, the left template sub-region is enabled for the template-based inter prediction. On the other hand, because the neighboring block that contains the samples $A_2$ and $A_3$ has residuals, the whole above template sub-region (i.e., $A_0$ to $A_3$) is not used as template samples.

Template-Based Inter Prediction Based on Weighted Prediction Samples.

As discussed above, whether there are residuals or not is a factor in determining how similar the prediction samples and the reconstructed samples are. In some embodiments, the prediction samples that have small residuals play a more important role than the prediction samples that have large residuals to achieve an accurate estimation of the coding parameters for the template-based inter prediction. In some such embodiments, it is proposed to apply unequal weights to different prediction samples based on the values of their residuals.

Again, using the same example in FIG. 13, as the prediction samples $A_0$ and $A_1$, and $L_0$ to $L_3$ do not have residuals, they are considered to be more reliable. When using these samples to estimate the template parameters, larger weight may be assigned to those samples. Conversely, because the prediction samples $A_2$ and $A_3$ have non-zero residuals, those samples will be given a smaller weight when being used as template samples. The weighted prediction samples will be used as the input for the estimation of the template parameters. Specifically, with the incorporation of the weighted template samples into FRUC template-matching, the weighted SAD between the template samples of a block and its matching samples in the reference picture is calculated as:

$$SAD_{weight} = \sum_{i=1}^{N} w_i \cdot |T(x_i, y_i) - T_r(x_i + v_x, y_i + v_y)| \quad (6)$$

where $T(x_i, y_i)$ is the template sample at the coordinate $(x_i, y_i)$; $T_r(x_i+v_x, y_i+v_y)$ is the corresponding reference sample of the template sample based on the motion vector $(v_x, v_y)$ in the reference picture; and $w_i$ is the weight that is assigned to $T(x_i, y_i)$. Additionally, with the integration of the weights into the derivation of the scaling factor and the offset for the LIC, equations (2) and (3) will become:

$$\alpha_{0/1} = \frac{\left(\sum_{i=1}^{N} w_i\right) \cdot \sum_{i=1}^{N} (w_i \cdot T(x_i, y_i) \cdot T_{0/1}(x_i + v_x^{0/1}, y_i + v_y^{0/1})) - \sum_{i=1}^{N} (w_i \cdot T(x_i, y_i)) \cdot \sum_{i=1}^{N} (w_i \cdot T_{0/1}(x_i + v_x^{0/1}, y_i + v_y^{0/1}))}{\left(\sum_{i=1}^{N} w_i\right) \cdot \sum_{i=1}^{N} (w_i \cdot T(x_i, y_i) \cdot T_{0/1}(x_i + v_x^{0/1}, y_i + v_y^{0/1})) - \left(\sum_{i=1}^{N} w_i \cdot T_{0/1}(x_i + v_x^{0/1}, y_i + v_y^{0/1})\right)^2} \quad (7)$$

$$\beta_{0/1} = \frac{\sum_{i=1}^{N} (w_i \cdot T(x_i, y_i)) - \alpha_{0/1} \cdot \sum_{i=1}^{N} (w_i \cdot T_{0/1}(x_i + v_x^{0/1}, y_i + v_y^{0/1}))}{\left(\sum_{i=1}^{N} w_i\right)} \quad (8)$$

Different methods may be used to calculate the value of $w_i$. In one embodiment, it is proposed to calculate the weight value for each prediction sample according to the magnitude of its residual. Specifically, in this method, the weight assigned to a template sample is calculated as $$w_i = \frac{W(x_i, y_i)}{\sum_{i=1}^{N} W(x_i, y_i)} \quad (9)$$

where $W(x_i, y_i)$ is the non-normalized weight factor of the template sample $T(x_i, y_i)$ and may be derived based on the magnitude of the template sample's residual $Res(x_i, y_i)$ as:

$$W(x_i, y_i) = \begin{cases} 1/|Res(x_i, y_i)|, & Res(x_i, y_i) \neq 0 \\ 1.5, & Res(x_i, y_i) = 0 \end{cases} \quad (10)$$

Because all the primary transforms and secondary transforms that are applied in the JEM are orthogonal transforms, the total energy of the residual signal of a coding block is preserved before and after the transform/inverse transform. Therefore, aside from the minor impact due to the rounding errors caused by the conversion of the floating-point operations to fixed-point operations in transform/inverse transform, the total energy of the residual samples of a block is substantially the same as that of the transform coefficients of the block. Based on such characteristic, to reduce the encoding/decoding latency, the magnitude ratio that is used in equation (10) may be calculated in the transform domain without applying the de-quantization and the inverse transform.

In another embodiment, two fixed weights $w_0$ and $w_1$ are used (where $w_0 > w_1$ and $w_0 + w_1 = 1$); $w_0$ is used for all the prediction samples that have zero residuals and $w_1$ is used for all the prediction samples that have non-zero residuals.

Template-Based Inter Prediction Based on Adding a DC Offset to Prediction Samples.

As shown in FIG. 2 and FIG. 3, like HEVC and its preceding standards, 2D transform and 2D inverse transform are also used in the JEM to achieve a good energy compaction on the prediction residual. For most cases, after horizontal and/or vertical transforms, the majority of signal energy in a coding block is concentrated into a few low-frequency coefficients. Especially, for certain coding blocks that are covered in the areas that lack strong directional edges, textures and/or fast-moving objects, the error between the original signal and the prediction signal of the block (i.e., the residuals of the block) may be relatively constant or slowly varying throughout different sample positions inside the block. In such case, the 2D transform may even compact the energy of the residuals into one single coefficient (e.g., the DC coefficient for the conventional DCT-II transform that is used in HEVC and previous standards) in the transform domain.

As discussed above, the accuracy of the derived template parameters is dependent on the similarity between the prediction signal and the reconstructed signal of the template samples. Examining closely how the FRUC motion search is performed and how LIC parameter derivation is performed, one finds that the template sample values are often evaluated in a collective manner (either in the form of SAD or following equations (2) and (3)). This means that the high frequency components in the template signal may be much less important than the low frequency components of the template. In some embodiments, it is proposed to correct the prediction signal by adding just the DC component onto the prediction samples before they are used as template samples for the template-based inter prediction methods. Doing this will correct the most important frequency of the template samples (i.e. the DC component) without incurring latency, because the reconstruction of the DC component is relatively easy and does not require inverse transform.

In block-based video coding, when lossy coding is applied, transform coefficients (including the DC coefficient) need to be quantized before being sent from encoder to decoder. Therefore, in some embodiments, to acquire the correct DC value of the residuals ($DC_{rec}$), the DC coefficient ($DC_{coef}$) that is parsed from the bitstream will be dequantized before being added to the prediction signal, e.g. as follows $$DC_{rec} = \text{round}(DC_{coef} \cdot Q_{step}) = \text{round}\left(DC_{coef} \cdot 2^{\frac{QP-4}{6}}\right) \quad (30)$$

where round(·) is the function which round the input floating value to its nearest integer; $Q_{step}$ is the quantization step size; and QP is a quantization parameter. Additionally, due to the dynamic range increase caused by the 2D orthogonal transforms (e.g., the core transforms in the DCT/DST family), another factor is introduced into equation (11) to ensure that the calculated DC value is in the correct dynamic range. Specifically, in a proposed method, the following DC offset is added to the prediction samples:

$$DC_{rec} = \text{round}(DC_{coef} \cdot Q_{step}) = \text{round}\left(DC_{coef} \cdot 2^{\frac{QP-4}{6}} \cdot \frac{1}{\sqrt{nT_h \cdot nT_v}}\right) \quad (12)$$

where $nT_h$ and $nT_v$ are the size of the horizontal and vertical transforms that are being applied to the block. Equation (12) is a floating-point operation. In practice, divisions and multiplications in equation (12) can be approximated by multiplying scaling factors followed by right shifts of appropriate bits. Based on such consideration, in one embodiment, equation (12) becomes:

$$DC_{rec} = \text{round}\left(DC_{coef} \cdot 2^{\frac{QP-4}{6}} \cdot \frac{1}{\sqrt{nT_h \cdot nT_v}}\right) = \quad (13)$$

$$(M_{Bsize} \cdot DC_{coef} \cdot desScale[QP\%6] + 2^{B-1}) \gg B$$

$$B = 6 - \text{floor}\left(\frac{QP}{6}\right) + \log_2\left(\text{floor}\left(\frac{\log_2(nT_h) + \log_2(nT_v)}{2}\right)\right) + L_{BSize}$$

where $M_{Bsize}$ and $L_{Bsize}$ are the scaling factor and the number of bits for the right shift that are used (together with the right shift of $$\log_2\left(\text{floor}\left(\frac{\log_2(nT_h) + \log_2(nT_v)}{2}\right)\right)$$

to approximate the value of $$\frac{1}{\sqrt{nT_h \cdot nT_v}},$$

which are calculated as:

$$M_{BSize} = \begin{cases} 1, & (\log_2(nT_h) + \log_2(nT_v))\ \%2 = 0 \\ 181, & (\log_2(nT_h) + \log_2(nT_v))\ \%2 \neq 0 \end{cases}, \quad (14)$$

$$L_{BSize} = \begin{cases} 0, & (\log_2(nT_h) + \log_2(nT_v))\ \%2 = 0 \\ 8, & (\log_2(nT_h) + \log_2(nT_v))\ \%2 \neq 0 \end{cases}$$

As shown in equation (14), $M_{Bsize}$ and $L_{Bsize}$ are introduced to compensate the 0.5-bit right shift when the dynamic range increase due to the size of 2D transform cannot be purely implemented by right shifts. Based on the existing quantization design in the HEVC and the JEM, the quantization step size increases approximately $2^{1/6}$ times with each increment of QP and approximately increase $2^{0.5}$ for every 3 increments of QP. Therefore, in another embodiment, instead of scaling-based method (as in equation (14)), it is proposed to decrease the QP value by 3 to approximate the 0.5-bit right shift when the dynamic range increase of the 2D transform is not exactly equal to the power of 2. Specifically, in this method, the DC offset is calculated as:

$$DC_{rec} = \text{round}\left(DC_{coef} \cdot 2^{\frac{QP-4}{6}} \cdot \frac{1}{\sqrt{nT_h \cdot nT_v}}\right) \quad (15)$$

$$= (DC_{coef} \cdot desScale[(QP - QP_{offset})\ \%6] + 2^{B-1}) \gg B$$

$$B = 6 - \text{floor}\left(\frac{(QP - QP_{offset})}{6}\right) + \log_2\left(\text{floor}\left(\frac{\log_2(nT_h) + \log_2(nT_v)}{2}\right)\right)$$

where $QP_{offset}$ is equal to:

$$QP_{offset} = \begin{cases} 0, & (\log_2(nT_h) + \log_2(nT_v))\%2 = 0 \\ 3, & (\log_2(nT_h) + \log_2(nT_v))\%2 \neq 0 \end{cases} \quad (16)$$

In addition to the conventional DCT-II core transform, other transform bases, e.g., DCT-VIII, DCT-V, DST-VII, DST-I and the KLT-based NSST transform bases, are used at both the primary transform stage and the secondary transform stage in the current JEM to further improve the transform coding efficiency. Due to the different characteristics of those transform basis functions, the transform coefficient at lowest frequency may not correspond to the true DC value.

Figure 14:
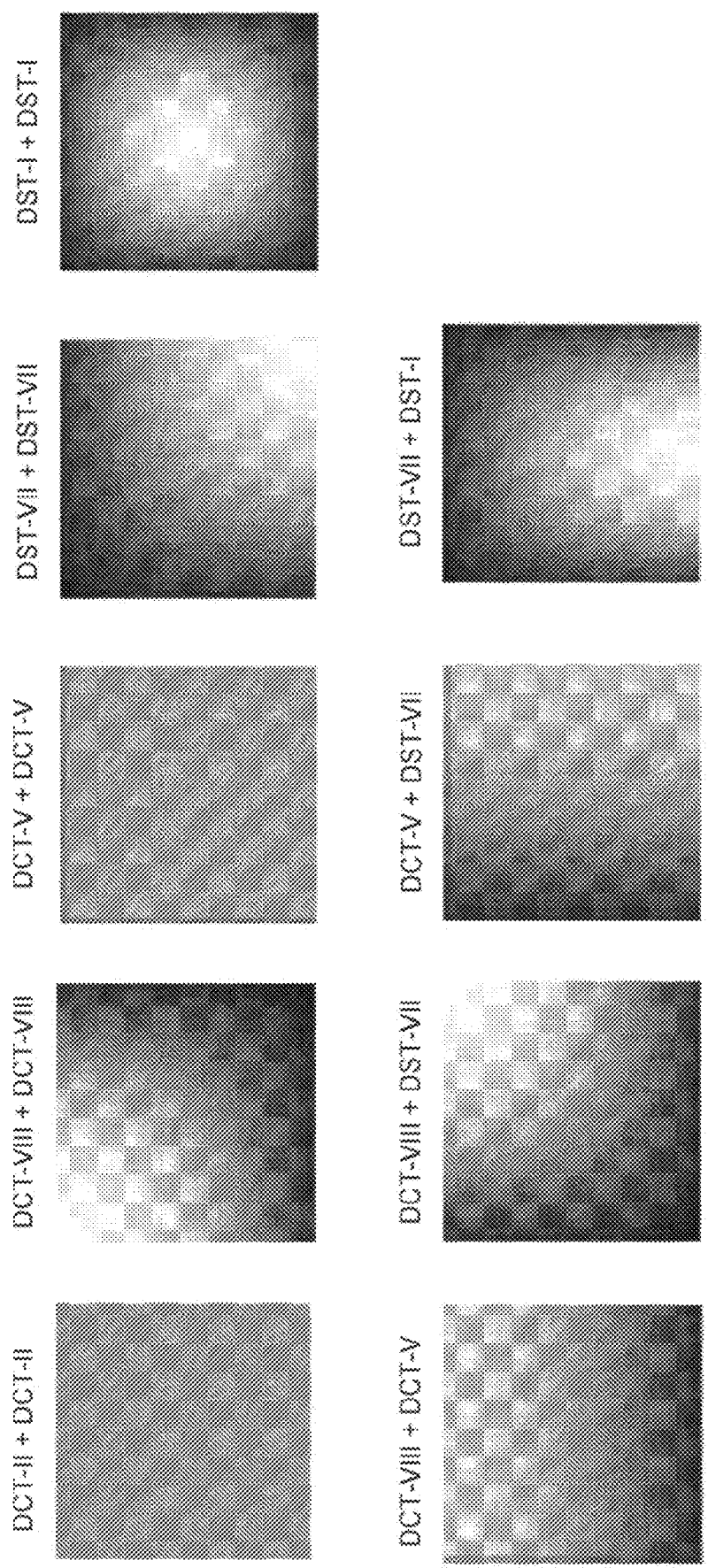
FIG. 14 illustrates the lowest frequency response of the primary transforms that are used in the JEM.

FIG. 14 illustrates the lowest frequency responses of the primary transform functions that are used in the current JEM, where each sub-figure corresponds to a pair of a horizontal transform and a vertical transform. As shown in FIG. 14, except for the transforms DCT-II+DCT II and DCT-V+DCT-V, the lowest frequency responses of the other core transform basis functions are far away from being accurate for approximating the real DC value. Based on such observation, in one embodiment, it is proposed to only add the DC offset (e.g., the offset as calculated in equation (12)) to the prediction signal when a block is coded by using the primary transform of either DCT-II or DCT-V; for the blocks that use the other primary transform functions, the prediction signal will be directly used as the template samples without adding the offset.

In another embodiment, it is proposed to only add the DC offset to the prediction signal when a block is coded without the NSST; for the blocks that are coded with the NSST, the prediction signal will be directly used as the template samples without adding the offset. In the other embodiment, it is proposed to add the DC offset to the prediction signal of all blocks, regardless of what primary transform function are used and whether the NSST is applied or not.

In another embodiment, when a block is coded with the AMT or the NSST being enabled, it is proposed to introduce another DC scaling factor to compensate the difference between the lowest frequency transform coefficient and the real DC value. With the incorporation of such a scaling factor, equation (12) further becomes:

$$DC_{rec} = \text{round}(DC_{coef} \cdot Q_{step}) = \qquad (17)$$
$$\text{round}\left(DC_{coef} \cdot 2^{\frac{QP-4}{6}} \cdot \frac{1}{\sqrt{nT_h \cdot nT_v}} \cdot Scale_{DC}\right)$$

where $Scale_{DC}$ is a DC scaling factor which may be calculated as the ratio of the signal energy of the lowest frequency response of the applied transform functions (e.g., the ones that are shown in FIG. 14) relative to that of the DCT-II transform for which the lowest frequency response is true DC. As one special case, when the DCT-II is used as the primary transform, the value of $Scale_{DC}$ is equal to 1, i.e., no scaling being applied.

Template-Based Inter Prediction Based on Adaptive Template Size.

In the current template-based inter prediction methods in the JEM, a fixed template size (e.g., four rows/columns of neighboring samples for the FRUC template-matching mode and one row/column of neighboring samples for LIC) is used. However, such a design may not be optimal due to the correlation between the samples of a coding block and its template samples being dependent on the selected template size. For example, choosing a large template size has the drawback that the samples of the template tend to be far away from the target block. Therefore, the correlation between the current block and its template may be insufficient. On the other hand, large template size may also be advantageous in the sense that it can yield a more reliable estimation in the presence of noise (e.g., the video capture noise and the noise caused by the coding process). Some embodiments operate to select an appropriate template size for different block sizes, which should be large enough against noise while not exceeding the size limit to ensure a sufficient correlation between the template and the target block.

In one embodiment, a template size of 2 is used for the blocks for which either the width or the height is smaller than or equal to 8. Otherwise (both the width and the height are larger than 8), a larger template size of 4 (i.e., L=4) is used. In another embodiment, the template size may be adaptively selected at the encoder and signaled to the decoder. To do that, additional syntax elements may be introduced, for example, at the sequence, picture and/or slice level, to specify the corresponding template sizes that are used for different block sizes. Various methods may be applied at the encoder to determine the optimal template size (e.g. for a given block size). For example, analysis may be done at encoder to determine the noise that is contained in the original video as well as the coding noise that the encoding process may introduce (e.g. based on the QP value). If the noise level is high, then a large template size may be selected to counteract the noise; otherwise (i.e., the noise level is small), a small template size may be selected to ensure the samples of the current block and the template are sufficiently correlated.

Template-Based Inter Prediction Based on Template Slice.

As noted above, one cause of encoding/decoding latency for template-based inter prediction methods is the dependency between the MCP of a template-based coding block and the reconstruction of its neighboring samples. Additionally, as shown in FIG. 10, the worst-case encoding/decoding latency introduced by the template-based prediction directly relates to the maximum number of consecutive blocks that are coded by the template-based inter prediction methods.

In some embodiments, "template slices" are used to limit the maximum encoding/decoding latency of the template-based inter prediction techniques. Specifically, with the use of template slices, a picture/slice is divided into multiple separate segments (or template slices) and the decoded samples of each block in a segment are only allowed to be used as the template samples for the template-based coding of other blocks in the same segment, but not allowed to be used as template samples for template-based coding of the blocks in any of the other segments. In this way, the encoding/decoding of the blocks in each template slice can be completely independent from the other template slices.

Figure 15:
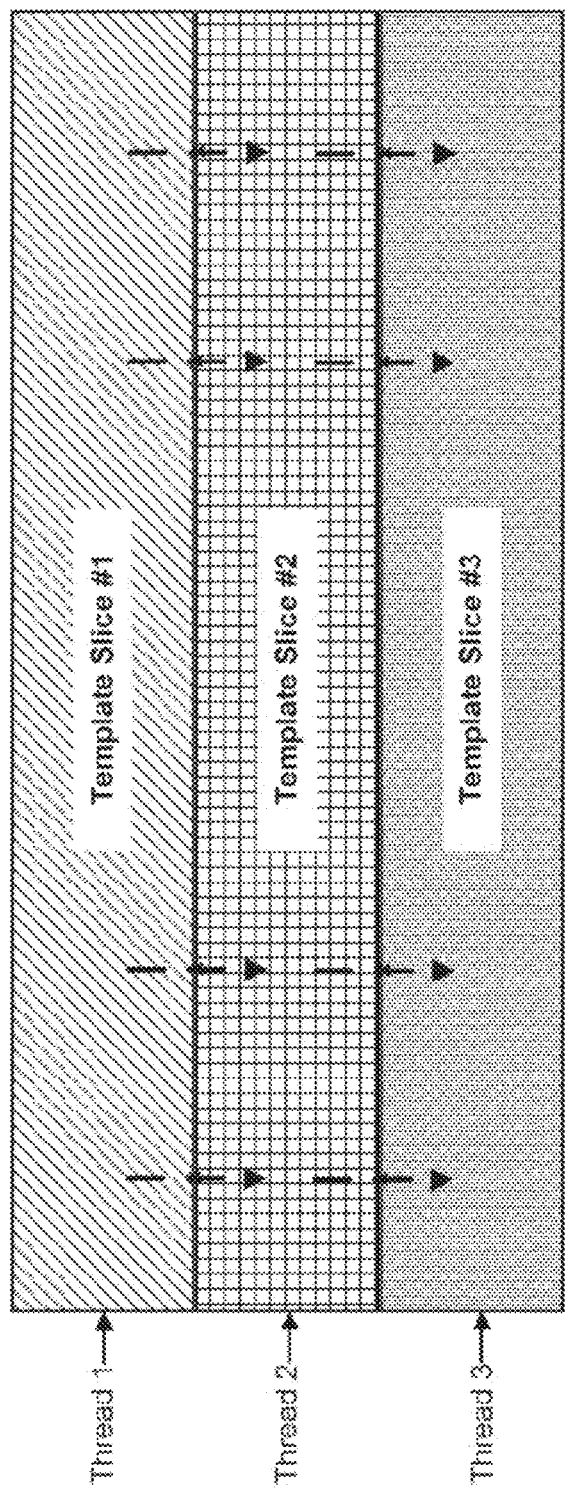
FIG. 15 illustrates an example in which a current picture is divided into three template slices.

Additionally, in embodiments, unlike conventional slices, template slices only break the dependency of the template-based inter prediction; they do not affect other decoding processes. For example, the in-loop filters, intra prediction and AMVP can still be operated across template slice boundaries. In this way, the potential coding loss due to the removal of template sample dependency between template slices can be minimized. FIG. 15 gives one example to illustrate the concept of the proposed template slice. As shown in FIG. 15, the decoding processes of multiple template slices can now be done in parallel by assigning them to different threads.

By analogy to the other parallelism tools in HEVC and the JEM (e.g., slices, tiles and wave-front parallel processing (WPP)), for template slices, the number of template slices and the position of each template slice inside a picture/slice can be freely chosen by the encoder and signaled to the decoder. Various selections (e.g. the number of template slices, as well as their sizes and positions) can lead to different trade-offs between coding performance and encoding/decoding parallelism. In general, having more template slices improves the parallelism but also lowers the coding efficiency.

In terms of template slice signaling, syntax elements may be added at the sequence and/or picture level. For example, the number of CTUs in each template slice may be signaled in the Sequence Parameter Set (SPS) and/or the Picture Parameter Set (PPS), or may be signaled in the slice header. Other variations of syntax elements may be used, for example, the number of CTU rows may be used, or the number of template slices in each picture may be used, etc. A flag may be signaled to indicate at the sequence or picture level if template slices are used.

In another embodiment, the number of the CTUs or CTU rows of each template slice may be different from each other. For example, a syntax element may be firstly signaled in the SPS, PPS and/or slice to indicate the number of template slices in the current sequence, picture or slice, followed by a set of other syntax elements which specify the corresponding number of CTUs or CTU rows in each template slice respectively. Additionally, in the above discussion, the boundary of each template slice is always aligned with CTU boundaries (such that the size of a template slice is a multiple of the CTU size). In another embodiment, it is proposed to signal in the bitstream the size of the basic unit (which has to be a multiple of the minimum coding block size as specified in SPS) that is used to compose a template slice.

Applying the Proposed Template-Based Methods to Other Template-Based Coding Methods.

In the above discussion, the FRUC template-matching and LIC are used as examples to illustrate the proposed template-based methods, such as the methods described in the sections "Template-based inter prediction based on prediction signal" and "Template-based inter prediction based on template slice," above. However, in some embodiments, the proposed methods are applied to other template-based coding schemes. The proposed methods as discussed above can be adapted to other template-based coding methods where the reconstructed neighboring samples are used for the encoding/decoding of the current block, including template-based coding methods such as transform coefficient sign prediction, motion vector difference sign derivation, template-based motion vector prediction, merge candidate reorder, and transform syntax reorder.

For example, when using the proposed template sample derivation for those template-based coding methods based on prediction samples, instead of the reconstructed neighboring samples, the prediction samples (with or without adding the DC component) are used to calculate the cost functions that are used to select the sign values (e.g., the transform coefficient sign prediction and the motion vector difference sign derivation) and the motion vectors (e.g., template-based motion prediction and merge candidate reorder). As one example, when the prediction-based template derivation is applied to the sign prediction of transform coefficients, the cost function as described in equation (4) becomes $$\text{cost} = \sum_{x=0}^{w} |(-Pred_{x,-1} + 2Pred_{x,0} - P_{x,1}) - r_{x,1}| +$$

$$\sum_{y=0}^{h} |(-Pred_{-1,y} + 2Pred_{0,y} - P_{1,y}) - r_{1,y}|$$

where Pred is the prediction signal of the neighboring samples, P is prediction of the current block, and r is the residual hypothesis.

More generally, when multiple prediction techniques (for example, AMVP or merge mode similar to HEVC, FRUC, LIC, template-based MVD sign prediction, template-based MV prediction, template-based sign prediction and OBMC) are available, a version of the prediction signal can be generated for a neighboring block using one or more prediction techniques. This initial version may be further adjusted based on one or more other prediction techniques to refine the prediction signal, which can be added to the prediction residual for the neighboring block to reconstruct the neighboring block. For the current block to be encoded or decoded, the prediction signal of the neighboring block (the initial version or the adjusted one) can be used to form the template when applying template-based inter prediction to the current block.

In the examples as shown in FIGS. 9-12, prediction processes (MCP, OBMC) are assumed to be implemented before the prediction residual generation processes (de-quantization and inverse transform). However, the prediction processes can be implemented independently of the prediction residual generation processes, and the prediction block and the residual block may be obtained in different orders than what is described before. It should be noted that the present techniques of using neighboring prediction samples for template-based inter prediction of the current block would still be applicable when the residual block is generated in a different order.

Figure 16:
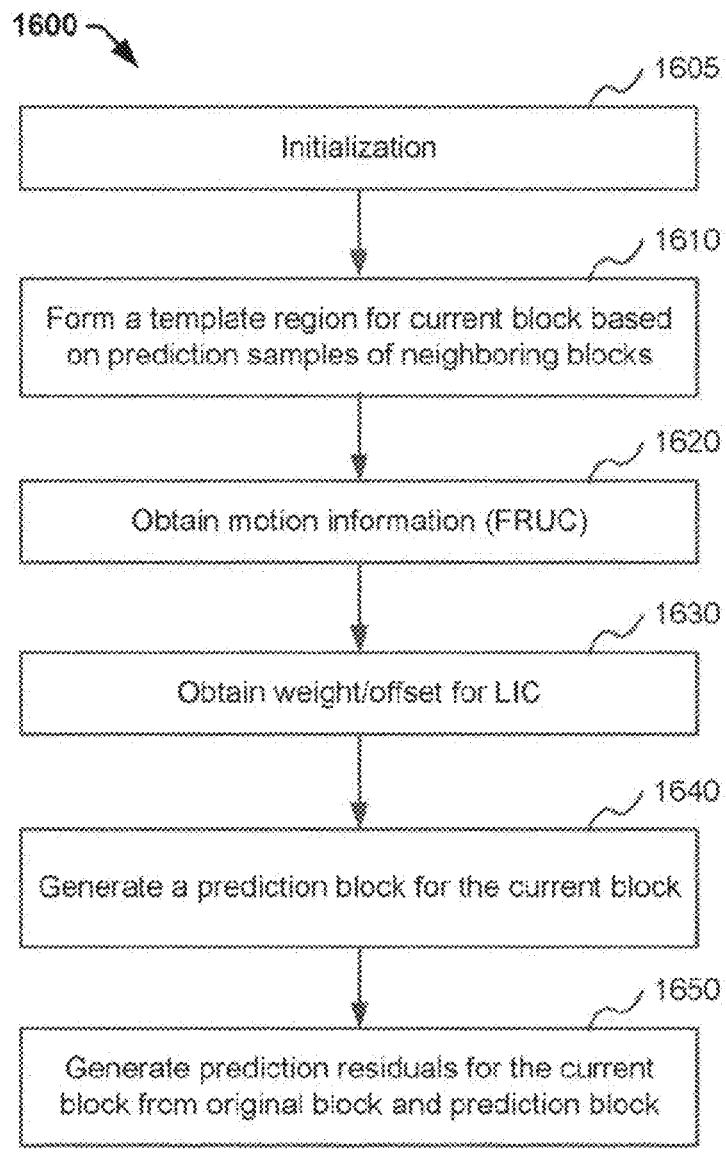
FIG. 16 illustrates an example process for encoding a block using template-based inter prediction, according to an embodiment.

FIG. 16 illustrates an example method 1600 for encoding a block using template-based inter prediction, according to an embodiment. Method 1600 starts at an initialization step 1605. In the initialization step, an encoder may access the prediction samples of neighboring blocks that can be used to form a template and the CBFs of the neighboring blocks. At step 1610, the template for the current block is formed based on prediction samples of neighboring blocks. As described before, the template may be formed by neighboring samples from top and left adjacent blocks, or the template may be formed by further using the information indicating whether the neighboring samples correspond to zero or non-zero residuals. The size of template may also be adapted to the block size or the noise level. The prediction samples used for the template may be obtained after performing part or all of the inter prediction processes. The corresponding template in the reference picture is then formed using the reconstructed samples.

Using the templates, template-based inter prediction is then performed. At step 1620, FRUC is performed to obtain the motion vector. At step 1630, the weight and offset are obtained for LIC. The parameters obtained from steps 1620 and 1630 may be used to generate the prediction for the current block at step 1640. Other prediction techniques, such as OBMC, can also be used in generating the prediction. At step 1650, the prediction residuals for the current block can be generated by subtracting the prediction block from the original block. The prediction residuals can then be quantized, transformed and entropy coded.

Figure 17:
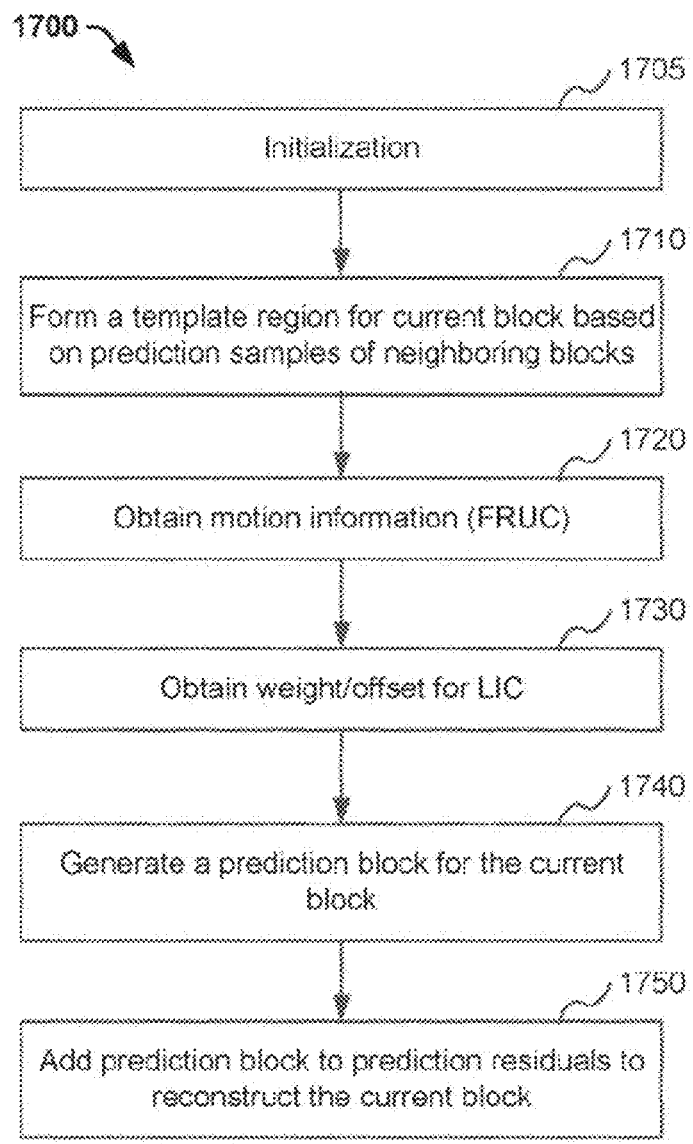
FIG. 17 illustrates an example process for decoding a block using template-based inter prediction, according to an embodiment.

FIG. 17 illustrates an example method 1700 for decoding a block using template-based inter prediction, according to an embodiment. Method 1700 starts at an initialization step 1705. In the initialization step, a decoder may access the prediction samples of neighboring blocks that can be used to form a template, the CBFs of the neighboring blocks, and the quantized transform coefficients for the current block. At step 1710, the template for the current block is formed based on prediction samples of neighboring blocks. In order for the bitstream to be correctly decoded, the template at the decoder side should be formed in the same manner as the encoder side. The corresponding template in the reference picture is then formed using the reconstructed samples.

Using the templates, template-based inter prediction is then performed. At step 1720, FRUC is performed to obtain the motion vector. At step 1730, the weight and offset are obtained for LIC. The parameters obtained from steps 1720 and 1730 may be used to generate the prediction for the current block at step 1740. Other inter prediction techniques, such as OBMC, can also be used in generating the prediction. At step 1750, the current block can be decoded by adding the prediction block to the prediction residuals of the current block.

In the examples of FIG. 16 and FIG. 17, FRUC and LIC are used for generating the prediction block. Other template-based coding techniques may also be performed in order to contribute to the prediction (and/or reconstruction) of the current block. It should be noted that the encoding or decoding method may proceed with only FRUC (no LIC), with only LIC (no FRUC), with both FRUC and LIC, or more generally with any feasible combination of the template-based coding methods as described before.

Various methods and other aspects described in this application can be used to modify modules, for example, the inter prediction, and/or transform modules (162, 104, 112, 262, 212), of a video encoder 100 and decoder 200 as shown in FIG. 2 and FIG. 3. Moreover, the present aspects are not limited to VVC or HEVC, and can be applied, for example, to other standards and recommendations, and extensions of any such standards and recommendations.

Various numeric values are used in the present application, for example, the block size used to determine the template size The specific values are provided for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a video encoder, a video decoder or both, a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, or optical properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

It is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for video encoding, comprising:
   dividing a current picture into a plurality of separate template slices, each template slice comprising a plurality of blocks;
   signaling at least one of a number of template slices in said current picture and a position of each template slice in said current picture at a sequence level or a picture level;
   determining an inter prediction mode for a block in a current template slice, wherein the inter prediction mode is selected from among at least one template-based inter prediction mode and at least one non-template-based inter prediction mode; and
   generating a prediction for each block in the current template slice, wherein the prediction of a block in the current template slice using a template-based inter prediction mode is based on samples in a template region for the block and is constrained from using for the prediction any samples that are in the current picture but are outside the current template slice, wherein non-template-based inter prediction modes are allowed to use, for the prediction, samples that are outside the current template slice, and wherein the template region includes previously reconstructed neighboring samples, in the current template slice, for the block.

2. The method of claim 1, wherein in-loop filter and intra prediction are allowed to operate across template slice boundaries.

3. The method of claim 1, wherein blocks in different template slices in the current picture are encoded in parallel.

4. A non-transitory machine readable medium having stored thereon machine executable instructions that, when executed, implement a method of video encoding according to claim 1.

5. An apparatus for video encoding, comprising at least a memory and one or more processors, wherein said one or more processors are configured to:
   divide a current picture into a plurality of template slices, each template slice comprising a plurality of blocks;
   signal at least one of a number of template slices in said current picture and a position of each template slice in said current picture at a sequence level or a picture level;
   determine an inter prediction mode for each block in a current template slice, wherein the inter prediction mode is selected from among at least one template-based inter prediction mode and at least one non-template-based inter prediction mode; and
   generate a prediction for each block in the current template slice, wherein the prediction of a block in the current template slice using a template-based inter prediction mode is based on samples in a template region for the block and is constrained from using for the prediction any samples that are in the current picture but are outside the current template slice, wherein non-template-based inter prediction modes are allowed to use, for the prediction, samples that are outside the current template slice, and wherein the template region includes previously reconstructed neighboring samples, in the current template slice, for the block.

6. The apparatus of claim 5, wherein in-loop filters and intra prediction are allowed to operate across template slice boundaries.

7. The apparatus of claim 5, wherein non-template-based inter prediction modes are not constrained from using, for the prediction, coding information from blocks that are outside the current template slice.

8. The apparatus of claim 5, wherein a number of coding tree units (CTUs) in each template slice is signaled in a bitstream.

9. The apparatus of claim 5, wherein blocks in different template slices in the current picture are decoded in parallel.

10. A method for video decoding, comprising:
    dividing a current picture into a plurality of template slices, each template slice comprising a plurality of blocks;
    decoding at least one of a number of template slices in said current picture and a position of each template slice in said current picture signaled at a sequence level or a picture level;
    determining an inter prediction mode for a block in a current template slice, wherein the inter prediction mode is selected from among at least one template-based inter prediction mode and at least one non-template-based inter prediction mode; and generating a prediction for each block in the current template slice, wherein the prediction of a block in the current template slice using a template-based inter prediction mode is based on samples in a template region for the block and is constrained from using for the prediction any samples that are in the current picture but are outside the current template slice, wherein non-template-based inter prediction modes are allowed to use, for the prediction, samples that are outside the current template slice, and wherein the template region includes previously decoded neighboring samples, in the current template slice, for the block.

11. The method of claim 10, wherein in-loop filters and intra prediction are allowed to operate across template slice boundaries.

12. The method of claim 10, wherein blocks in different template slices in the current picture are decoded in parallel.

13. A non-transitory machine readable medium having stored thereon machine executable instructions that, when executed, implement a method of video decoding according to claim 10.

14. An apparatus for video decoding, comprising at least a memory and one or more processors, wherein said one or more processors are configured to:

divide a current picture into a plurality of template slices, each template slice comprising a plurality of blocks;

decode at least one of a number of template slices in said current picture and a position of each template slice in said current picture signaled at a sequence level or a picture level;

determine an inter prediction mode for each block in a current template slice, wherein the inter prediction mode is selected from among at least one template-based inter prediction mode and at least one non-template-based inter prediction mode; and generate a prediction for each block in the current template slice, wherein the prediction of a block in the current template slice using a template-based inter prediction mode is based on samples in a template region for the block and is constrained from using for the prediction any samples that are in the current picture but are outside the current template slice, wherein non-template-based inter prediction modes are allowed to use, for the prediction, samples that are outside the current template slice, and wherein the template region includes previously decoded neighboring samples, in the current template slice, for the block.

15. The apparatus of claim 14, wherein in-loop filters and intra prediction are allowed to operate across template slice boundaries.

16. The apparatus of claim 14, wherein non-template-based inter prediction modes are not constrained from using, for the prediction, coding information from blocks that are outside the current template slice.

17. The apparatus of claim 14, wherein a number of coding tree units (CTUs) in each template slice is signaled in a bitstream.

18. The apparatus of claim 14, wherein blocks in different template slices in the current picture are decoded in parallel.

* * * * *